United States Patent
Regan et al.

(10) Patent No.: US 9,884,404 B2
(45) Date of Patent: Feb. 6, 2018

(54) BUFFING EXPANDED FOAM ITEMS

(71) Applicant: NIKE, Inc., Beaverton, OR (US)

(72) Inventors: Patrick Conall Regan, Taichung (TW); Dong Woo Lee, Busan (KR); Geun Rok Park, Busan (KR); Dong Youp Yang, Kimhae (KR); Yong Joo Chon, Busan (KR); Byung Gi Kim, Busan (KR); Sang Gyu Lee, Kimhae (KR); Jong Cher Seo, Busan (KR)

(73) Assignee: NIKE, INC., Beaverton, OR (US)

( * ) Notice: Subject to any disclaimer, the term of this patent is extended or adjusted under 35 U.S.C. 154(b) by 808 days.

(21) Appl. No.: 14/060,218

(22) Filed: Oct. 22, 2013

(65) Prior Publication Data

US 2015/0107032 A1    Apr. 23, 2015

(51) Int. Cl.
| | |
|---|---|
| *B24C 1/08* | (2006.01) |
| *B29D 35/12* | (2010.01) |
| *A43D 117/00* | (2006.01) |
| *B29D 35/00* | (2010.01) |
| *B29C 44/56* | (2006.01) |

(52) U.S. Cl.
CPC ............ *B24C 1/086* (2013.01); *A43D 117/00* (2013.01); *B29C 44/5627* (2013.01); *B29D 35/0054* (2013.01); *B29D 35/0063* (2013.01); *B29D 35/122* (2013.01)

(58) Field of Classification Search
CPC .................................................... B24C 1/086
See application file for complete search history.

(56) References Cited

U.S. PATENT DOCUMENTS

| | | |
|---|---|---|
| 3,246,352 A | 4/1966 | Fladeland et al. |
| 3,702,519 A | 11/1972 | Rice et al. |
| 3,716,947 A | 2/1973 | Carpenter et al. |
| 3,822,617 A | 7/1974 | Weichel |

(Continued)

FOREIGN PATENT DOCUMENTS

| | | |
|---|---|---|
| CN | 1972780 A | 5/2007 |
| EP | 1125514 A2 | 8/2001 |

(Continued)

OTHER PUBLICATIONS

Final Office Action dated Feb. 9, 2017 in U.S. Appl. No. 14/060,224, 9 pages.

(Continued)

*Primary Examiner* — Larry Thrower
(74) *Attorney, Agent, or Firm* — Shook, Hardy & Bacon, LLP

(57) ABSTRACT

Foam items may be buffed using particles such as particulate sodium bicarbonate in accordance with the present invention. Foam items may be, for example, expanded EVA foam items pre-formed into an intermediate size and shape. A skin layer may be formed during the expansion of the foam item to form an expanded foam item which may be entirely or partially removed by buffing the item using particles projected with selected buffing parameters. The buffing parameters may be varied based upon the thickness of at least a portion of the skin layer and/or the desired degree of moldability for the foam item after buffing. Particulate sodium bicarbonate or other types of particles used for buffing may be recycled and reused for further buffing of foam items.

20 Claims, 16 Drawing Sheets

(56) References Cited

U.S. PATENT DOCUMENTS

| | | |
|---|---|---|
| 4,018,006 A | 4/1977 | Moelders |
| 4,740,218 A | 4/1988 | Hensley et al. |
| 5,107,629 A | 4/1992 | Boyd et al. |
| 5,123,206 A | 6/1992 | Woodson |
| 5,182,882 A | 2/1993 | Brodene et al. |
| 5,203,124 A | 4/1993 | Carpenter |
| 5,203,665 A | 4/1993 | Lande |
| 5,308,404 A | 5/1994 | Yam et al. |
| 5,360,486 A | 11/1994 | Elliott |
| 5,367,838 A | 11/1994 | Visaisouk et al. |
| 5,839,945 A | 11/1998 | Elliott |
| 6,062,956 A | 5/2000 | Elliott |
| 6,442,968 B1 | 9/2002 | Proni et al. |
| 8,764,513 B1 | 7/2014 | Spears |
| 2002/0168924 A1 | 11/2002 | Visaisouk et al. |
| 2007/0243795 A1 | 10/2007 | Kobayashi et al. |
| 2011/0293914 A1* | 12/2011 | Maurer ............... B29C 44/569 428/304.4 |
| 2012/0302140 A1 | 11/2012 | Park |
| 2016/0136783 A1* | 5/2016 | Park ..................... A43B 13/04 451/39 |

FOREIGN PATENT DOCUMENTS

| | | |
|---|---|---|
| JP | H03191902 | 8/1991 |
| WO | 2005110184 A2 | 11/2005 |
| WO | 2010135081 A2 | 11/2010 |
| WO | 2011046698 A1 | 4/2011 |
| WO | 2011149706 A1 | 12/2011 |
| WO | 2011163160 A1 | 12/2011 |
| WO | 2012162052 A1 | 11/2012 |

OTHER PUBLICATIONS

Non-Final Office Action dated Jul. 28, 2016 in U.S. Appl. No. 14/060,224, 8 pages.
International Preliminary Report on Patentability dated May 6, 2016 for International Patent Application No. PCT/US2014/059904, 12 pages.
International Preliminary Report on Patentability dated May 6, 2016 for International Patent Application No. PCT/US2014/059296, 8 pages.
Final Office Action dated Mar. 10, 2016 in U.S. Appl. No. 14/060,224, 8 pages.
Non-Final Office Action dated Sep. 16, 2015 in U.S. Appl. No. 14/060,224, 9 pages.
International Search Report with Written Opinion dated Jan. 27, 2015 in PCT Application No. PCT/US2014/059296, 10 pages.
International Search Report with Written Opinion dated Feb. 10, 2015 in PCT Application No. PCT/US2014/059904, 12 pages.
Notice of Allowance dated Aug. 4, 2017 in U.S. Appl. No. 14/060,224, 5 pages.

* cited by examiner

BUFFING EXPANDED FOAM ITEMS

CROSS-REFERENCE TO RELATED APPLICATIONS

The present application is related by subject matter to U.S. patent application Ser. No. 14/060,224, entitled BUFFING EXPANDED FOAM ITEMS, filed Oct. 22, 2013.

FIELD

The aspects relate to the processing of foam items. More particularly, the present invention relates to buffing foam items made of a material such as ethylene vinyl acetate that has been formed into an expanded foam structure. The present invention relates to the processing of the surface of such a foam item to remove all or part of an exterior layer, such as a tough and dense skin layer, from the exterior of the foam item to permit the item to be more effectively molded into a subsequent form with the application of heat and/or pressure.

BACKGROUND

An article of footwear may be constructed with a foam sole portion. The formation of the foam portion may involve forming the foam portion into a pre-form foam portion having a size, shape, or surface that is not intended for a final assembly into an article of footwear. The forming of the pre-form foam portion may result in a higher density surface portion, such as a skin, being formed on the pre-form foam portion. The skin on the pre-form may increase the effort of further processing of the pre-form foam portion to result in a desired subsequent or final foam form that is intended to be assembled into an article of footwear.

SUMMARY

The present invention relates to the processing of foam items. More particularly, the present invention relates to buffing foam items made of a material such as ethylene vinyl acetate that have been formed into an expanded foam structure. The present invention relates to the processing of at least a portion of the surface of such a foam item to remove all or part of an exterior layer, such as a tough and dense skin layer, from the exterior of the foam item to permit the item to be more effectively molded into its final form with the application of heat and/or pressure.

Systems and methods in accordance with the present invention utilize particles, such as particulate sodium bicarbonate, to remove all or at least a portion of a foam item. In accordance with the present invention, particles of a particular size or range of sizes, of a particular chemical composition, and/or having a particular hardness or range of hardness may be applied at a predetermined pressure, angle, rate, and/or duration to remove at least a portion of the foam item, such as an expanded EVA foam item, prior to a final molding of the item. The parameters of the application of particles to the foam item may vary based upon the degree of moldability required for that foam item and/or the thickness of the skin layer of the foam item. If desired, particles remaining on the expanded foam item may be removed from the item prior to final molding. For example, excess particles may be removed from a foam item by using an air blowing system, a brush system, a rinse system that applies water, a vibrational system, or any other mechanism. In some examples, particles used in accordance with the present invention may be recycled to permit reuse for the removal of the skin layers from additional foam items.

DRAWINGS

The drawings described herein are for illustrative purposes only of selected examples, wherein.

Figure 7:
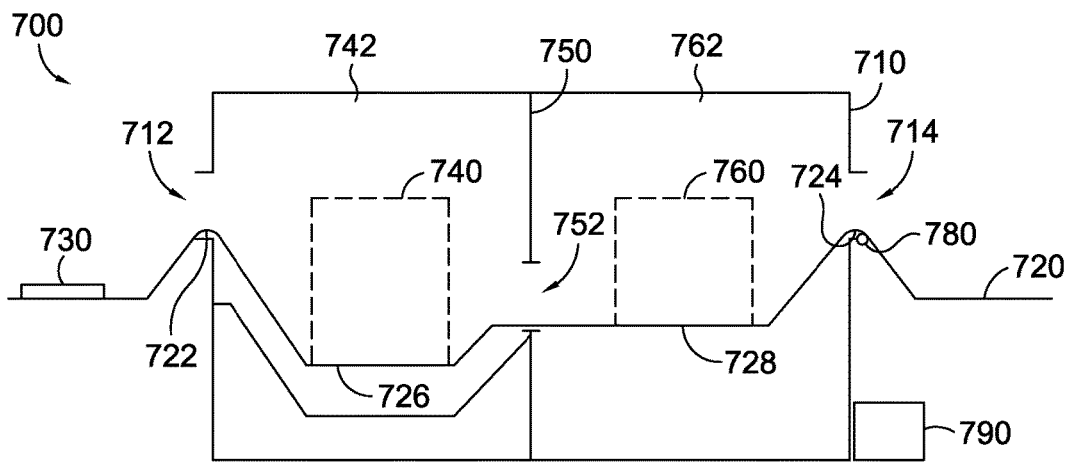
Figure 8:
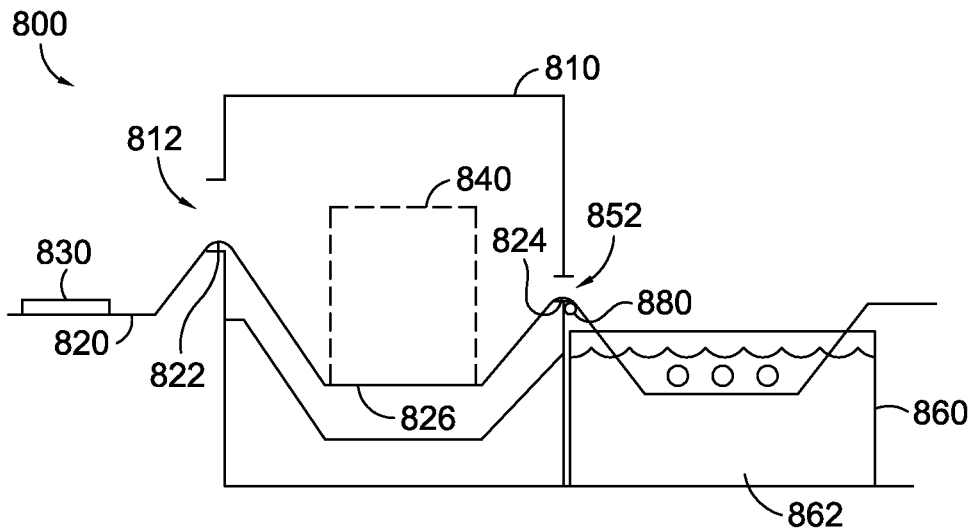
Figure 9A:
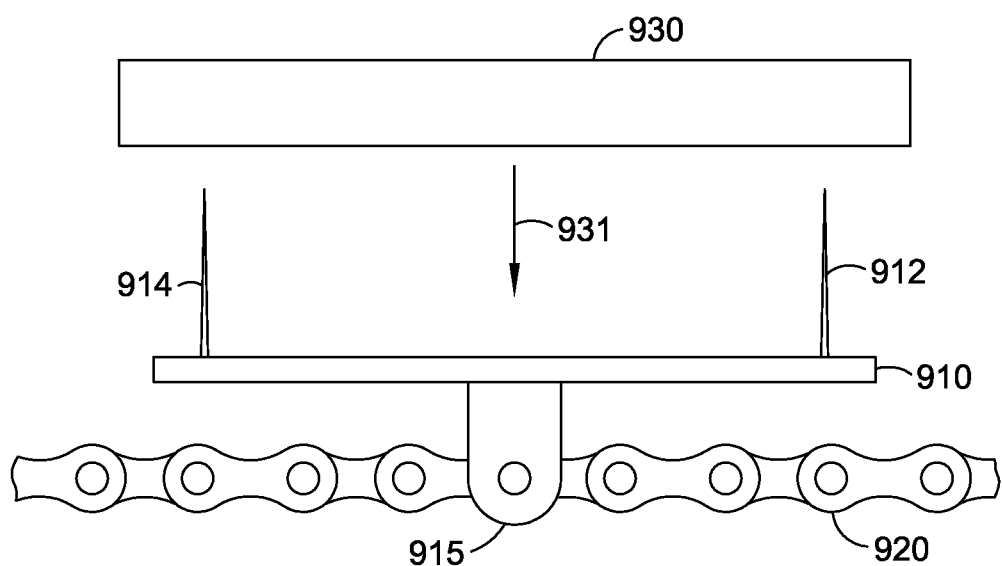
Figure 9B:
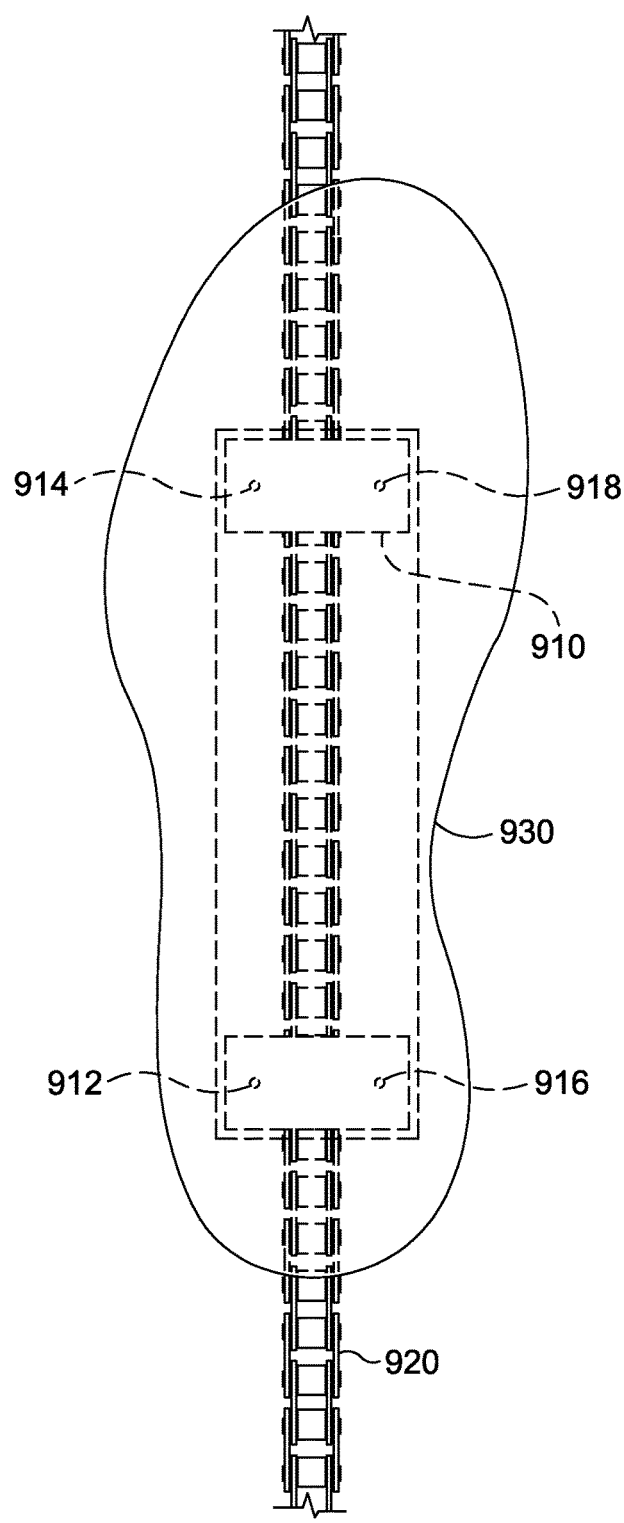
Figure 10:
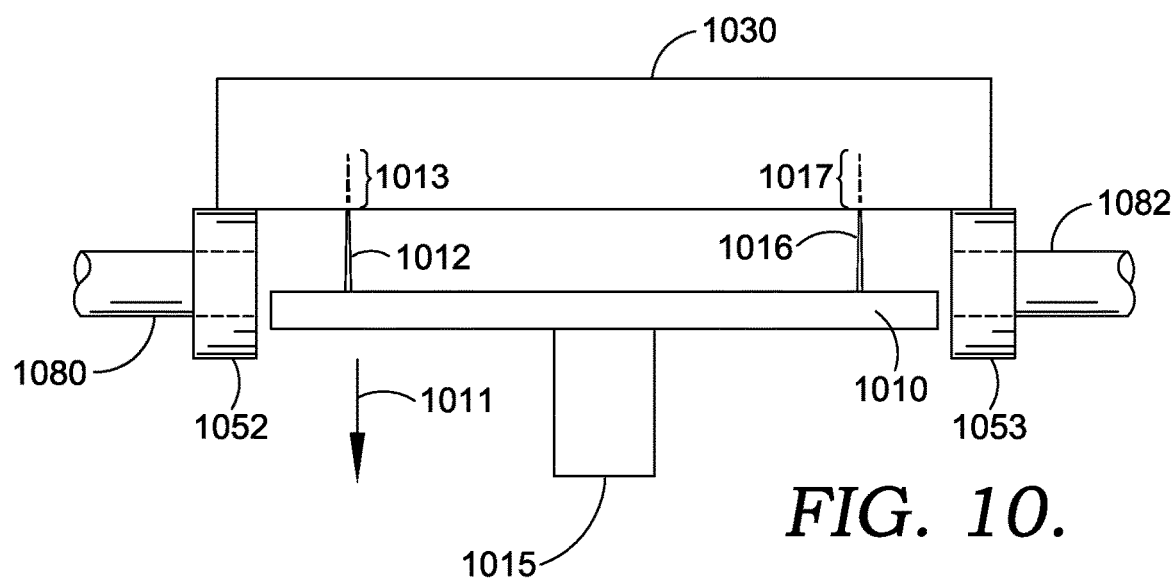
Figure 12A:
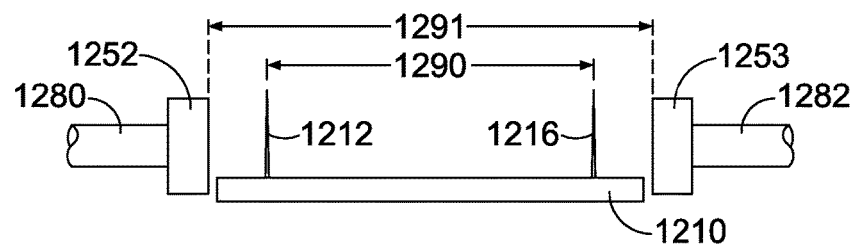
Figure 12B:
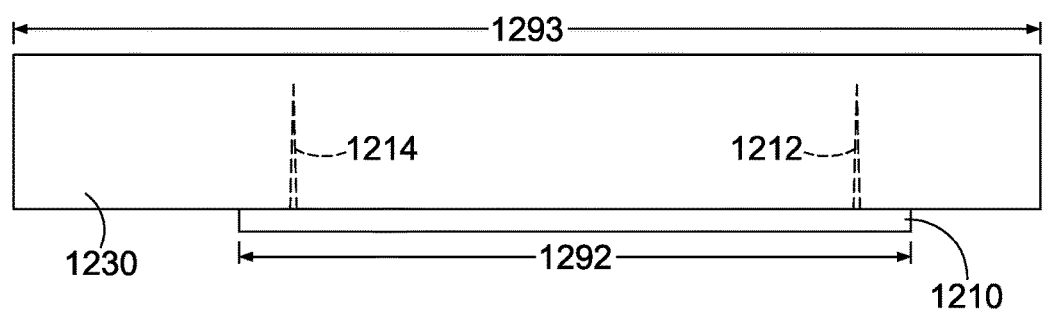
Figure 13:
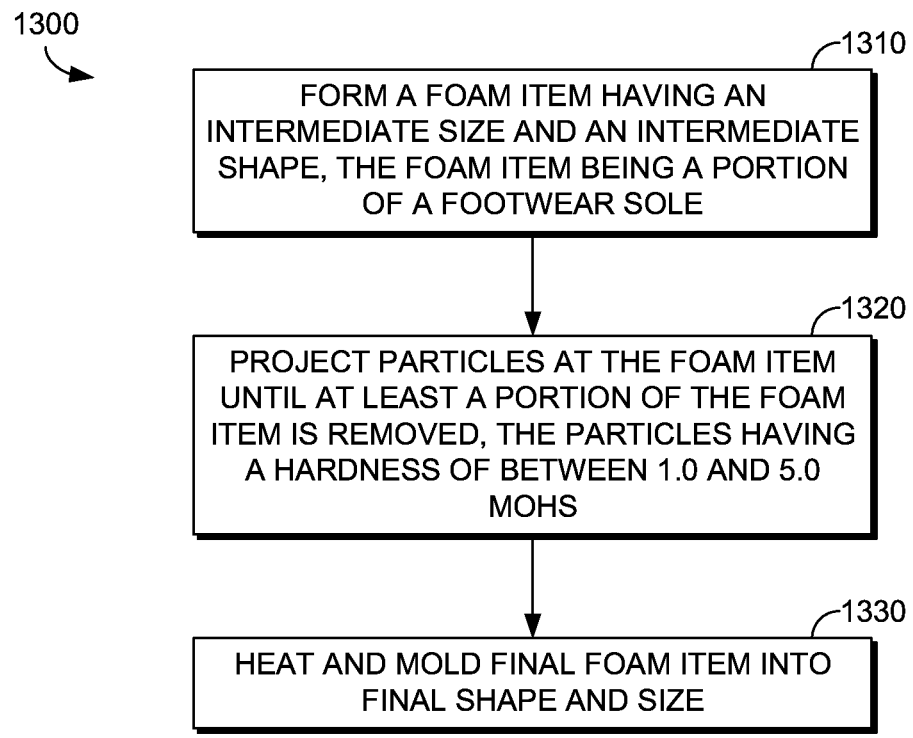
Figure 14:
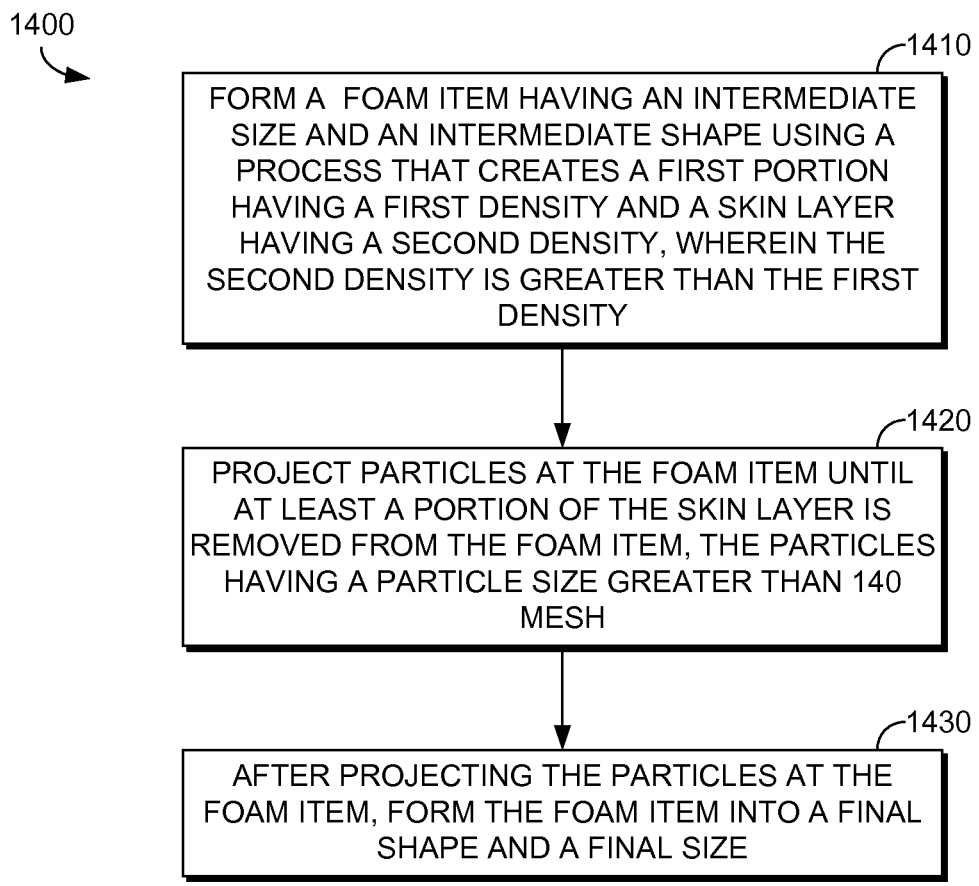
Figure 15:
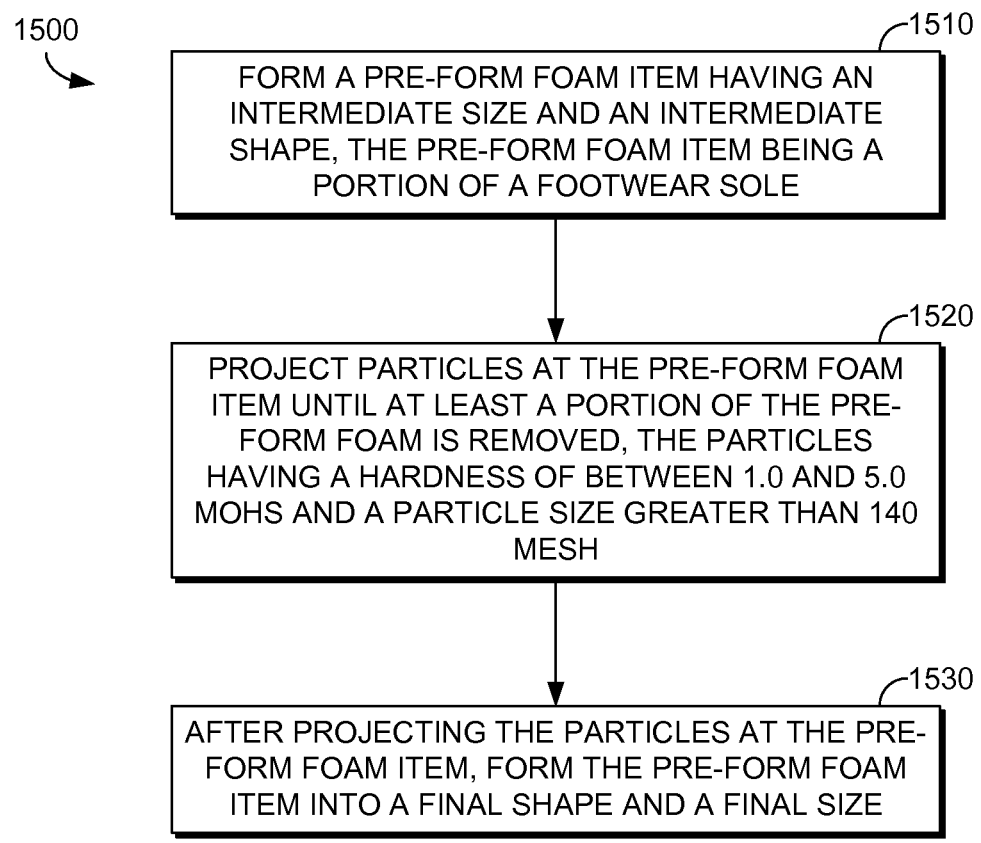
Figure 16:
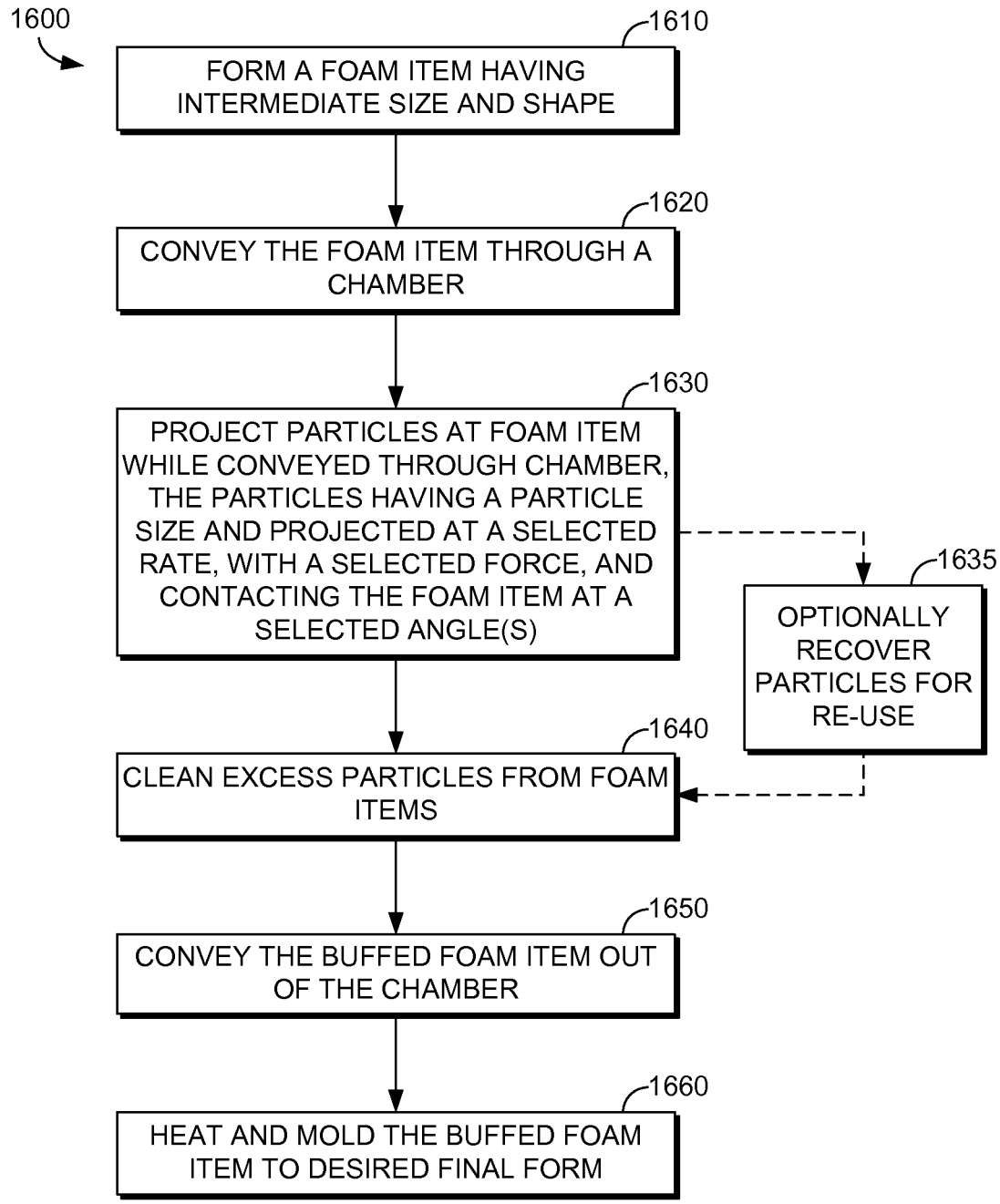
Figure 17:
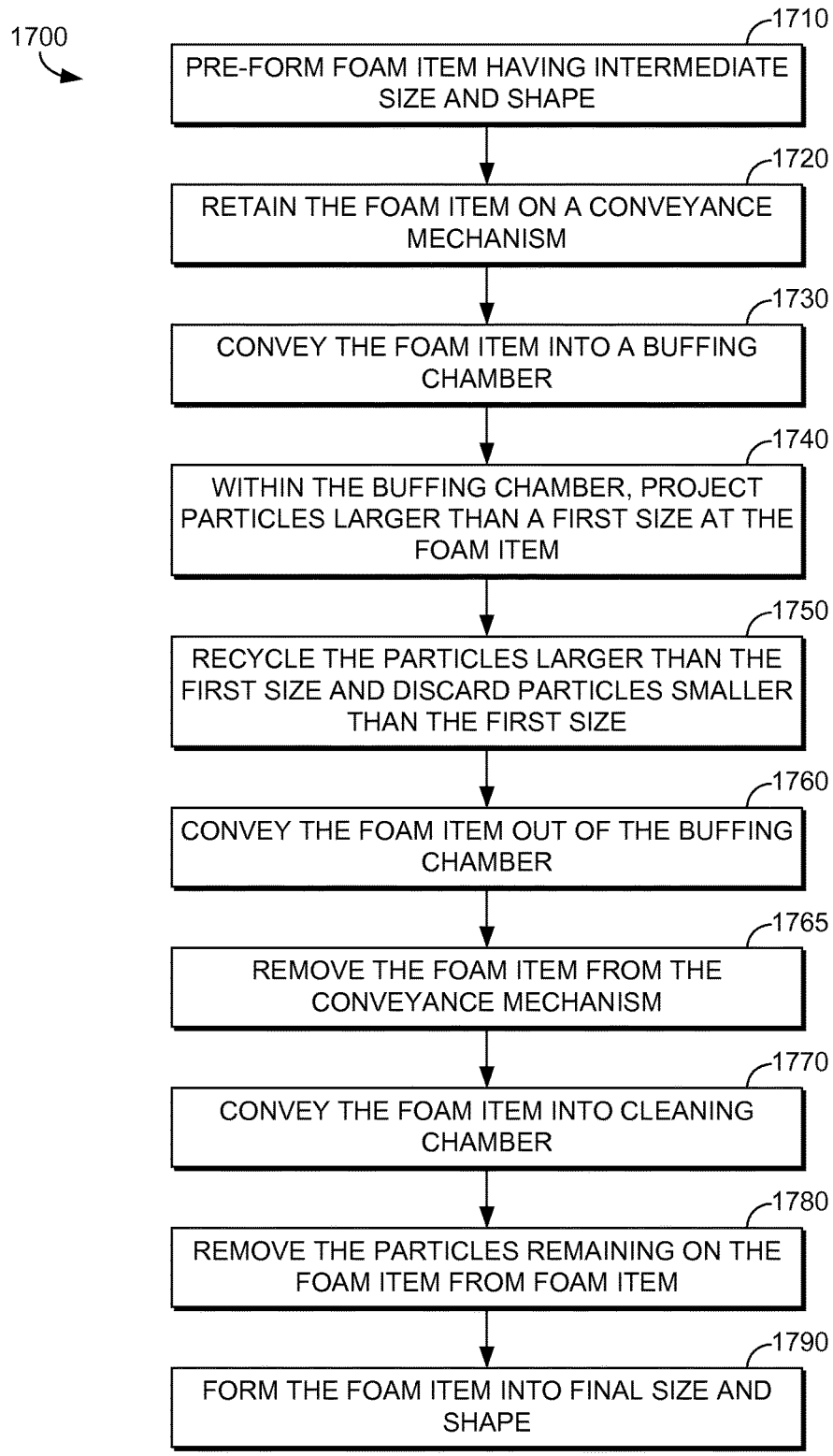
Figure 18:
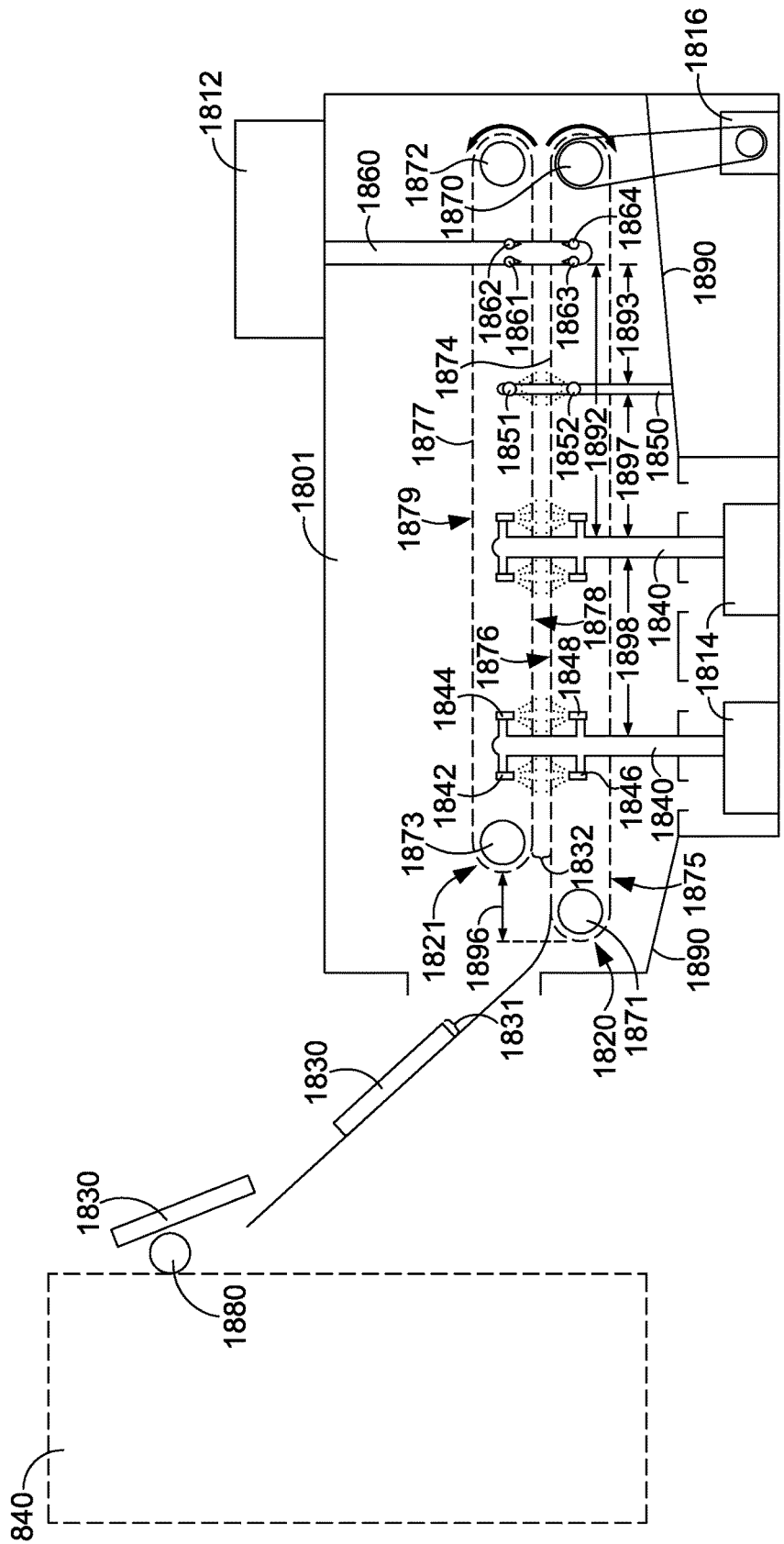
Figure 19A:
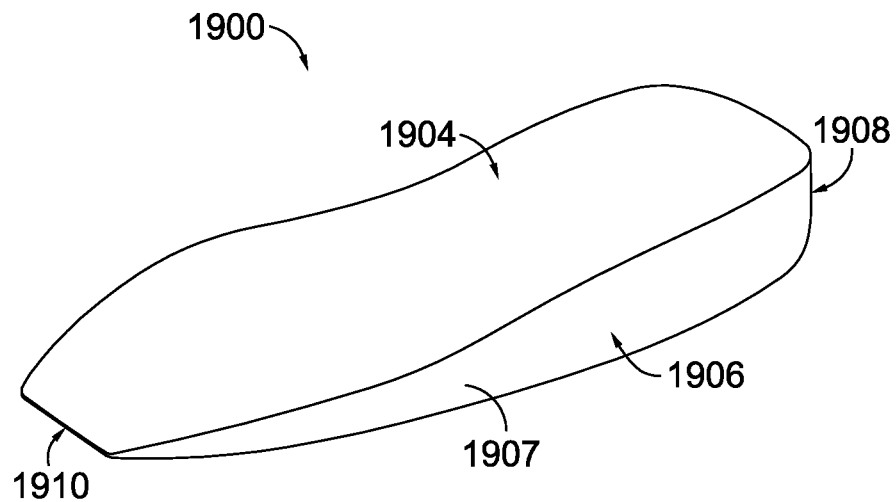
Figure 19B:
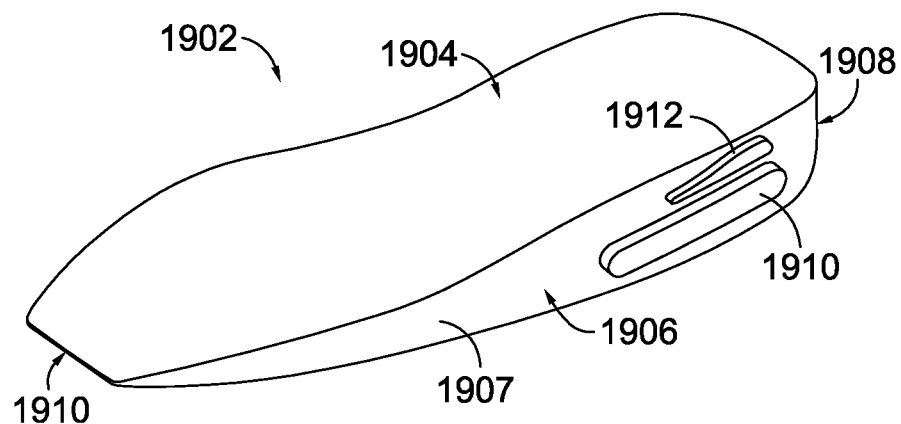

FIG. 7 schematically illustrates an example of a further system in accordance with the present invention;

FIG. 8 schematically illustrates an example of a further system in accordance with the present invention;

FIGS. 9A-9B illustrate an example of a retaining mechanism that may be used to retain a foam item to a conveyance mechanism in accordance with the present invention;

FIG. 10 illustrates an example removal mechanism that may be used in accordance with the present invention to remove a foam item from a retaining mechanism;

FIGS. 11A-11D illustrate an example of a removal mechanism that may be used in accordance with the present invention to remove a foam item from a retaining mechanism;

FIG. 12A illustrates an example of a retaining mechanism and a removal mechanism in accordance with the present invention;

FIG. 12B illustrates an example of a retaining mechanism and a foam item in accordance with the present invention;

FIG. 13 illustrates a method for processing a foam item in accordance with the present invention;

FIG. 14 illustrates a method for buffing a foam item in accordance with the present invention;

FIG. 15 illustrates a method for processing a foam item in accordance with the present invention;

FIG. 16 illustrates a method for processing a foam item in accordance with the present invention;

FIG. 17 illustrates a method for buffing a foam item in accordance with the present invention;

FIG. 18 illustrates a cleaning system for cleaning a foam item in accordance with the present invention;

FIG. 19A illustrates a side perspective of a foam item having an intermediate size and shape, in accordance with aspects of the present invention; and FIG. 19B illustrates a side perspective of a foam item having a final size and shape following a buffing operation and a molding operation, in accordance with aspects of the present invention.

DETAILED DESCRIPTION

The present invention relates to the processing of foam items. Aspects of the present invention concern buffing an expanded foam item to remove at least a portion of the foam item in preparation for further processing of the expanded foam item. One particular example of products that commonly utilize foams are articles of footwear. An article of footwear may include shoes, boots, sandals, and the like. For convenience, the term "shoe" is used herein as a representation of an article of footwear. Shoes often utilize ethylene vinyl acetates ("EVA"), polyurethane, or other types of foams to provide cushioning (e.g., impact attenuation) for midsoles or elsewhere in the construction of a shoe. While the present invention is described in some examples with particular reference to foams, such as EVA foams, for use in a shoe, the present invention may be utilized with other types of expanded foam materials and/or for use in products other than shoes.

In accordance with aspects of the present invention, a method for processing foam items is provided. The method may comprise forming a foam item having an intermediate size and an intermediate shape where the foam item may be eventually formed into a portion of a footwear sole. The method may include projecting particles at the foam item until at least a portion of the foam item is removed, where the particles may have a hardness of between 1.0 and 5.0 Mohs. The method may further include forming the foam item into a final shape and a final size.

Additional aspects of the present invention may relate to a method for buffing a foam item. The method may comprise forming a foam item having an intermediate size and an intermediate shape using a process that creates a first portion having a first density and a surface layer having a second density, where the second density may be greater than the first density. Stated differently, the surface layer is denser than an internal portion of the foam item, in an exemplary aspect. The method may include projecting particles at the foam item until at least a portion of the surface layer is removed from the foam item, the particles having a particle size between 20 mesh and 140 mesh. Further, the method may include after projecting the particles at the foam item, forming the foam item into a final shape and a final size.

Further aspects of the present invention may relate to a method for buffing a pre-form foam item. The method may include forming a pre-form foam item having an intermediate size and an intermediate shape, where the foam item may be a portion of a footwear sole. The method may include projecting particles at the pre-form foam item until at least a portion of foam is removed from the pre-form foam. The particles may have a hardness of between 1.0 and 5.0 Mohs and a particle size of no more than 20 mesh and no less than 140 mesh. The method may further include, after projecting the particles at the foam item, forming the pre-form foam item into a final shape and a final size.

One example of a foam that may be processed using systems and methods in accordance with the present invention are EVA foams. An expanded EVA foam item may be formed by applying heat and/or pressure to EVA material to activate a blowing agent that causes the expansion of the material to form the foam cell structure of an expanded foam. The application of heat and/or pressure in activating a blowing agent of the EVA foam often leads to the formation of an exterior layer on a foam item, such as EVA material, often referred to as a skin layer of the foam item. The skin layer may be a layer of foam that has a density that is greater than a density of other portions of the foam item. The skin layer may be a layer that may have been in direct contact with a mold used in the formation of the expanded foam item. In some aspects, the skin layer may be more resistant to change in shape and form than other portions of the foam item. Particularly, portions of the foam item with greater density may be more resistant to change in shape and form than other portions of the foam item that have a lesser density.

In some aspects, the resulting foam item formed from the initial application of heat and/or pressure to the foam material and prior to the final application of heat and/or pressure may be referred to as the intermediate configuration of the foam item or the "pre-form." The "pre-form" may be further processed into a final shape and final size. The foam items treated in accordance with the present invention may be EVA foam pre-forms, but need not be. In some aspects, a skin layer on a pre-form may have benefits for some applications, for example in terms of improved durability. However, in other aspects, if the pre-form is to be processed or molded further to create a finished part, the presence of a skin layer may interfere with the further formation and shaping of the pre-form into a final form. It may be advantageous to remove at least a portion of foam, such as a portion of the skin layer, from the foam item prior to further processing.

The application of particles, such as particulate sodium bicarbonate, to foam items in accordance with the present invention may be referred to as "buffing" the foam items. Buffing may be utilized to remove at least a portion of foam, such as the denser skin layer, from the foam item. Buffing may be performed by hand application of abrasive agents. However, in aspects of the present invention, buffing may be advantageously performed using systems and methods described herein to remove sufficient amounts of foam from the foam item without degrading the overall integrity of the foam item. Removing a portion of the foam item manually is both labor intensive and inconsistent in terms of the amount of a skin layer removed from an item. In practice, systems and methods in accordance with the present invention may avoid removing more foam from the foam item than necessary to allow for sufficient forming and shaping of the foam item into its final shape.

For example, a midsole for an athletic shoe may be created by first activating the blowing agent in a non-expanded EVA material to create a pre-form foam item. Non-expanded EVA material may be in the form of "biscuits" of EVA, EVA pellets, liquid EVA, or other forms or shapes. The pre-form foam item may be roughly the desired volume and shape for a final foam part. The pre-form foam item may not have the structural properties and/or aesthetic attributes desired for the finished shoe midsole or other item. Additionally, the pre-form foam item may have a skin layer that may have a density that is greater than the density of other portions of the pre-form. The skin layer may be resistant to further formation and shaping. In aspects of the present invention, systems and methods may remove at least a portion of foam, such as a portion of the skin layer, from the pre-form foam item. The pre-form foam item, having at least a portion of the skin layer removed, may be further processed into its final shape and size.

The particles used to buff foam items in accordance with the present invention may be selected to be sufficiently hard to be effective in removing at least a portion of the foam item, such as a portion of the skin layer. The particles may also be sufficiently soft to avoid damaging the foam item. Measured on the Mohs scale, acceptable hardness of particles may be from about 1.0 Mohs to about 5.0 Mohs, for example, or from about 1.5 Mohs to about 2.5 Mohs. In a preferred aspect, particles may have a hardness of between 1.0 and 3.0 Mohs. Some examples of materials that may be selected for use in buffing foam items in accordance with the present invention are sodium bicarbonate (sometimes referred to as baking soda), which has a hardness of approximately 2.4 Mohs; dry ice, which has a hardness of approximately 2.0 Mohs; and ice formed from water, which may have a hardness as low as about 1.5 Mohs at some temperatures. Both ice and dry ice are potentially advantageous types of particles for use in buffing foam items, as no cleaning of a buffed item may be needed if the particles are permitted to evaporate. The use of sodium bicarbonate for the removal of skin layers on foam items may be advantageous because sodium bicarbonate can be recycled. Further, sodium bicarbonate may be advantageous because the heat and/or pressure typically applied in the final molding of a foam item will effectively remove any remaining particulate sodium bicarbonate from the foam item, avoiding any discoloration or ongoing damage to the item and permitting the cleaning of particulate sodium bicarbonate from an item to be an optional step, or at least a step requiring limited resources.

Buffing systems in accordance with the present invention may comprise chambers that enclose moving particles used to buff foam items. The moving particles may be moved utilizing a circulation system. Foam items may be moved through the chambers by a conveyance mechanism, such as a conveyor belt. Further examples of buffing systems in accordance with the present invention may provide one or more dispensers that introduce particles into the chamber. In some examples, a plurality of dispensers may project particles directly or indirectly onto foam items to be buffed. Such a dispenser may comprise, for example, a nozzle that uses air pressure to project particles at a desired rate and/or force from a desired location to one or more foam items. Multiple dispensers projecting particles using air pressure may be simultaneously directed to propel particles at an angle substantially perpendicular to the surface of expanded foam items to be buffed. Multiple dispensers and/or the area of a chamber with projected sodium bicarbonate particles may comprise a buffing zone within the chamber.

If desired, a cleaning mechanism, such as an air blower, brushes, a rinsing system, a vibrational system or any other mechanism or combination of mechanisms may be used to remove excess particles, such as particulate sodium bicarbonate, from the foam items before they exit the chamber. A cleaning mechanism may be provided in a cleaning chamber separate from the buffing chamber where particles are projected. Alternatively, a single chamber may have a zone for buffing and a portion of a chamber occupied or accessed by the cleaning mechanism that may comprise a cleaning zone within the single chamber. By way of further example, systems and methods, in accordance with the present invention, may provide physically distinct chambers for the application of particles to a foam item and cleaning excess particles from a foam item. Systems and methods, in accordance with the present invention, may also provide a recycling mechanism that may gather previously dispensed particles, such as particulate sodium bicarbonate, used by the dispensers to permit its re-use.

Figure 1:
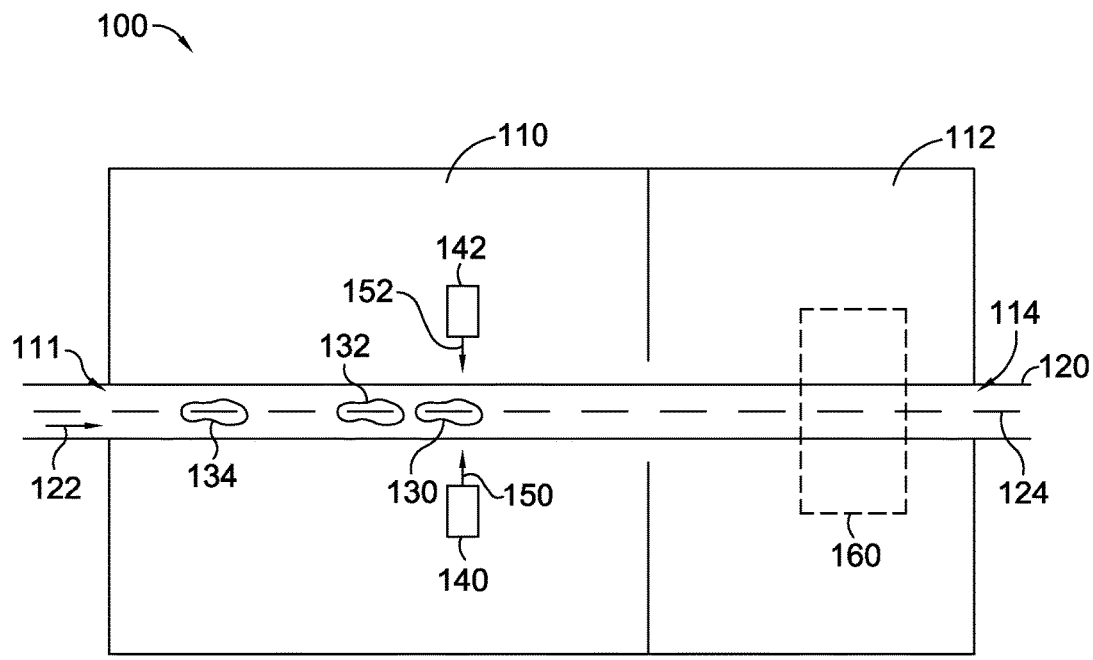
FIG. 1 illustrates a schematic diagram of an example buffing system in accordance with the present invention.

Referring now to FIG. 1, an exemplary system 100 for buffing foam items, such as expanded foam EVA items, is illustrated. As shown in the example of FIG. 1, system 100 may comprise a chamber 110 having an entrance 111 and/or an exit 114, although a single combined entrance and exit and/or multiple entrances and/or exits to a chamber may be used in accordance with the present invention. A conveyance mechanism 120 may carry a series of foam items, such as expanded EVA items, through chamber 110 along a path 124 generally in direction 122 that proceeds from chamber entrance 111 to chamber exit 114. While the example of FIG. 1 depicts a substantially linear path 124 of motion, in different examples, a conveyance mechanism, such as conveyance mechanism 120, may transport foam items in an irregular, nonlinear, curvilinear, zigzagging, or other type of path through a chamber such as chamber 110. Conveyance mechanism 120 may comprise one or more conveyor belts, chains, or other systems, that transport items on prongs, clips, racks, in baskets, etc., or any other type of system. In some examples foam items may be retained on a plurality of prongs that penetrate the foam item to detachably retain a foam item for transport.

A plurality of foam items may be transported through chamber 110 by conveyance mechanism 120. In the present invention of FIG. 1, a first item 130, a second item 132, and a third item 134 are illustrated. As can be seen in FIG. 1, in the present example the longitudinal axis of each of the foam items 130, 132, 134 is substantially aligned with the path 124 of the items. However, other orientations, or no particular orientation at all, may be used for foam items in accordance with the present invention.

Still referring to FIG. 1, within buffing chamber 110 one or more dispensers may project particles onto foam items 130, 132, 134 as they are transported through chamber 110 by conveyance mechanism 120. For example, a first dispenser 140 may project a fluid stream of particles 150 from one longitudinal side of a foam item 130, while a second dispenser 142 may project a fluid second stream of particles 152 from an opposing longitudinal side of the foam item 130. As used herein, the term "fluid" may refer to a liquid, a gas, and/or air. While the example illustrated in the example of FIG. 1 utilizes only two dispensers 140, 142 that are arranged on opposing sides of conveyance mechanism 120, other numbers, configurations, and orientations of dispensers may be used in accordance with the present invention, with some examples of alternative or additional arrangements described below. The configuration, number, and properties of the at least one dispenser used to apply particles to a foam item may be based upon the size and/or configuration of an item to be buffed, the portion of an item to be buffed, the degree of buffing desired, etc. For example, dispensers may be positioned so as to apply particles to portions of a foam item that will be subjected to further forming but to not apply particulate sodium bicarbonate to portions of a foam item that will not be subjected to further forming. In such an example, dispensers might apply particles to, say, the sides and top of a foam item but not the bottom of a foam item. However, in accordance with the present invention dispensers may be configured to apply particles over the entire surface of a foam item.

The type of particles 150, 152 applied by dispensers 140, 142 may vary based upon the hardness, size, recyclability, or other properties desired in buffing foam items 130, 132, 134. For example, particles may comprise ice (hardness as low as about 1.5 Mohs), dry ice (hardness of about 2.0 Mohs), and/or sodium bicarbonate (hardness of about 2.4 Mohs), or any other material having a hardness of between about 1.0-3.0 Mohs or between about 1.5-2.5 Mohs. If a readily reusable particle type is desired, particulate sodium bicarbonate of a relatively large size, such as a 20 mesh size, may be used and reused until the size of particles drop below a minimum size, such as 140 mesh. On the other hand, ice or dry ice remaining on the surface of a foam item may be removed by evaporation, while particulate sodium bicarbonate may require a cleaning mechanism to remove particles from an item after buffing. Further examples of systems and methods in accordance with the present invention are described for the use of particulate sodium bicarbonate, but other types of particulate materials may be used.

The size of a particle, in an exemplary aspect, is constrained by a number of factors. For example, the smaller size constraint, such as 140 mesh, is determined based on a number of factors. For example, a particle smaller than 140 mesh may clump in one or more nozzles at a given pressure and flow rate causing the nozzle to ineffectively distribute the particle or even clog the nozzle from being able to project the particle. Further, it has been determined in an exemplary scenario that as the size of a particle decreases, to say 140 mesh, a greater overall volume of particle materials are needed to have the same buffing result achieved by a larger particle. At the other end of the size spectrum, it is contemplated as the size of a particle exceeds a given value, the buffing process results in a less uniform buffing finish, in an exemplary aspect.

Still referring to FIG. 1, a cleaning mechanism 160 may be provided within a cleaning chamber 112, although cleaning mechanism 160 may alternatively be located within a single chamber 110 for buffing and cleaning. Cleaning mechanism 160 may remove excess particles, such as particulate sodium bicarbonate, from the foam items 130, 132, 134 after the dispensers 140, 142 have applied the particles to the items 130, 132, 134. Cleaning system 160 may comprise a water spray system that sprays or pours water onto items 130, 132, 134, but other cleaning mechanisms may be used for cleaning system 160. For example, a fan or other air blowing device that uses moving air to remove excess particles from the foam items 130, 132, 134. In other examples, a water submersion mechanism may be used for cleaning system 160 that allows for a foam item to be submerged under water. In additional examples, cleaning system 160 may comprise a moving or rotating brush that removes excess particles, but cleaning system 160 may further comprise other types of devices such as rinsing systems, vibrating systems, and/or combinations of devices. Some non-limiting further examples of cleaning systems 160 are described below.

Effectively, the exemplary system 100 depicted in FIG. 1 permits foam items 130, 132, 134, such as expanded EVA foam items still possessing an excessively thick skin, to enter the chamber 110 via entrance 111 on conveyance mechanism 120. Conveyance mechanism 120 may then convey the items 130, 132, 134 along path 124 in direction 122 so as to bring the items 130, 132, 134 into a position or series of positions to allow dispensers 140, 142 to dispense particles 150, 152 at the items 130, 132, 134 to partially or entirely remove the skin previously formed on those items 130, 132, 134, for example a skin formed in activating a blowing agent to form the desired cell structure for the items. Subsequent to the projection of particles 150, 152 the conveyance mechanism 120 may further move the items 130, 132, 134 to a cleaning system 160 that may remove at least some excess particles from items 130, 132, 134. Thereafter, conveyance mechanism 120 may move items 130, 132, 134 out of chamber 110 via exit 114 for any additional processing, such as molding the foam items 130, 132, 134 into their final forms or other processing of the items 130, 132, 134.

Figure 2:
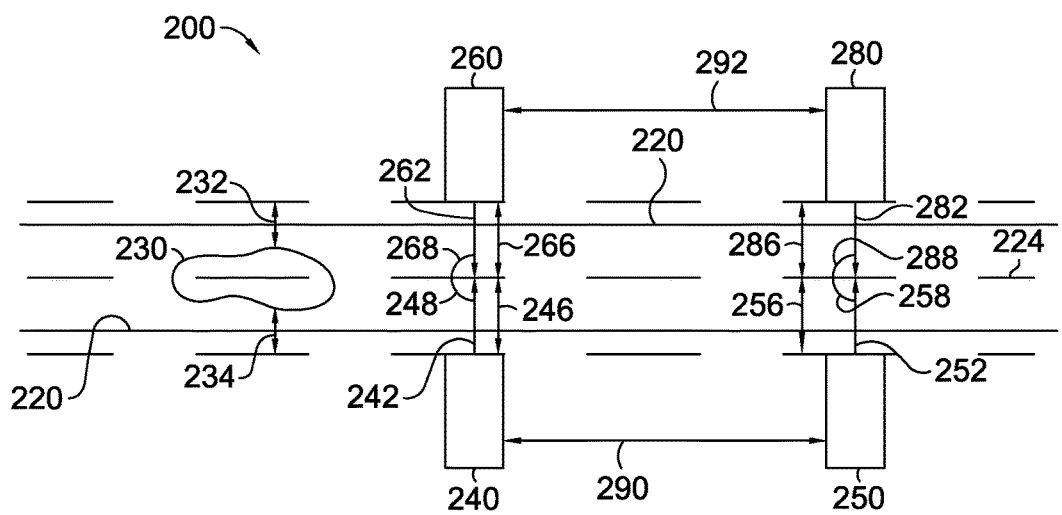
FIG. 2 illustrates a further schematic diagram of an example buffing system in accordance with the present invention.

Referring now to FIG. 2, a further example of a system 200 for buffing a foam item 230 is illustrated. FIG. 2 particularly illustrates some of the buffing parameters that may be used to determine the amount of skin removed from a foam item 230. As shown in FIG. 2, a first dispenser 240 may project a stream of particles, such as particulate sodium bicarbonate 242 in a first direction with a first angle 248 relative to the path of travel 224 created by conveyance mechanism 220. The first stream of particulate sodium bicarbonate 242 may also be projected with a predetermined force and/or at a predetermined rate. The location of first dispenser 240 may further determine a distance 246 from dispenser 240 to the center of conveyance mechanism 220 and a distance 234 from dispenser 240 to a surface of the foam item 230. Similarly, a second dispenser 250 may project a second stream of particles, such as particulate sodium bicarbonate 252 at a second angle 258 relative to the path of travel 224, with second dispenser 250 having a distance 256 from the center of conveyance mechanism 220, and, in this instance, a distance 234 from foam item 230. First angle 248 and second angle 258 may vary from between 30 degrees and 120 degrees. First dispenser 240 and second dispenser 250 may be separated by a distance 290 that may range from a fraction of a length of a foam item 230 to several multiples of a length of a foam item 230. On the opposing side of conveyance mechanism 220 from first dispenser 240 and second dispenser 250, a third dispenser 260 and a fourth dispenser 280 may alternatively/additionally project particles, such as particulate sodium bicarbonate, as conveyance mechanism 220 moves a foam item 230. Third dispenser 260 may project a third stream of particulate sodium bicarbonate 262 from a first distance 266 to the center of conveyance mechanism 220 and at a third angle 268. Fourth dispenser 280 may project a fourth stream of particulate sodium bicarbonate 282 from a fourth distance 286 to the center of conveyance mechanism 220 and at a fourth angle 288. Third dispenser 260 and fourth dispenser 280 may be separated by a distance 292 that may range from a fraction of a length of a foam item 230 to several multiples of a length of a foam item 230. In the example illustrated in FIG. 2, both third dispenser 260 and fourth dispenser 280 are located at a distance 232 from the surface of a foam item 230 as conveyance mechanism 220 transports the foam item 230 past third dispenser 260 and fourth dispenser 280.

While the example of FIG. 2 illustrates a symmetrical arrangement of four dispensers 240, 250, 260, 280, the present invention may utilize nonsymmetrical arrangements of dispensers of particulate sodium bicarbonate. For example, dispensers may be located at varying distances from the center of a conveyance mechanism, such as conveyance mechanism 220, may be located to form different angles relative to a path of travel 224 for a foam item 230, may be located at different distances from a surface of the foam item 230, and/or may be distributed nonuniformly around a conveyance mechanism such as 220 and/or a foam item such as item 230 so as to concentrate more or less particulate sodium bicarbonate on a given side, region, location, etc. of a foam item or a series of foam items. Further, even if present, not all dispensers present need be actively projecting particulate sodium bicarbonate simultaneously.

Figure 3:
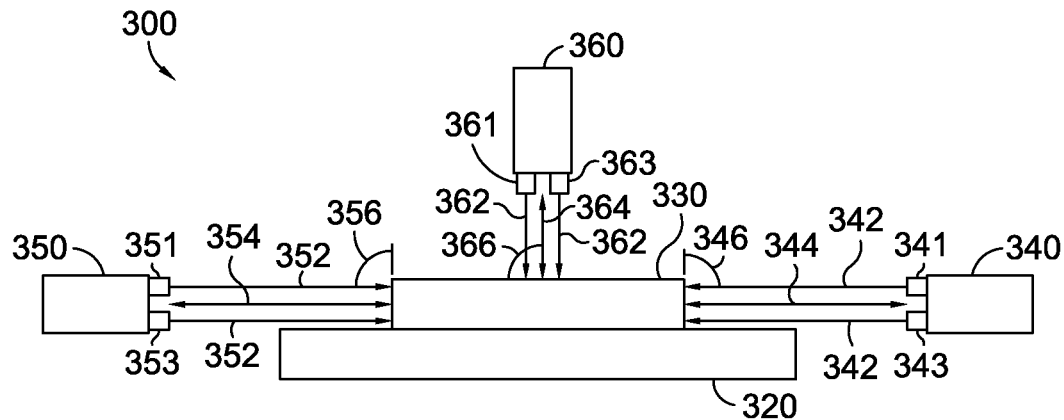
FIG. 3 illustrates a further schematic diagram of an example buffing system in accordance with the present invention.

Referring now to FIG. 3, a cross sectional schematic illustration of a further example of a system 300 in accordance with the present invention is shown. In the example of FIG. 3, a foam item 330 is transported by a conveyance mechanism 320 such that item 330 passes between a first lateral dispenser 340 that projects particles such as particulate sodium bicarbonate from a first nozzle 341 and a second nozzle 343, a second lateral dispenser 350 that projects particles such as particulate sodium bicarbonate from a first nozzle 351 and a second nozzle 353, and beneath a first vertical dispenser 360 that projects particles such as particulate sodium bicarbonate from a first nozzle 361 and a second nozzle 363. Essentially, system 300 dispenses particulate sodium bicarbonate to buff a foam item 330, for example to remove the skin from an expanded foam item, from the left, the right, and from above as conveyance mechanism 320 transports the foam item 330 through a buffing zone wherein particulate sodium bicarbonate may contact the item. As shown in the example of FIG. 3, dispenser 340 may dispense a stream of particulate sodium bicarbonate 342 from nozzles 341, 343 at a distance 344 and at an angle 346 toward item 330. Dispenser 350 may dispense a stream of particulate sodium bicarbonate 352 from nozzles 351, 353 at a distance 354 and at an angle 356 toward item 330. Operating from above item 330, dispenser 360 may dispense a stream of particulate sodium bicarbonate 362 from nozzles 361, 363 at a distance 364 and at an angle 366 relative to item 330. The angles 346, 356, 366 at which various dispensers 340, 350, 360 project particulate sodium bicarbonate at an item 330, as well as the distances 344, 354, 364, may be identical for all dispensers, may be different for different dispensers, or may vary during the buffing of an item such as item 330, for example by moving either the dispensers 340, 350, 360 during buffing and/or moving item 330 and/or conveyance mechanism 320 during buffing.

Figure 4:
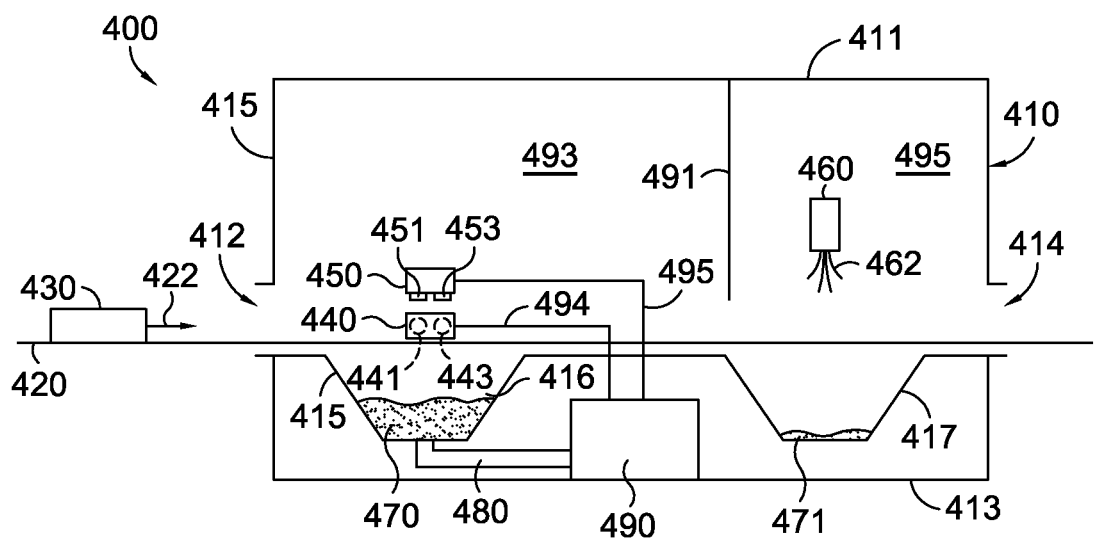
FIG. 4 illustrates a further schematic diagram of an example buffing system in accordance with the present invention.

Referring now to FIG. 4, a further example of a system 400 for buffing foam items such as item 430 is illustrated. In the example of FIG. 4, a conveyance mechanism 420 may move an item 430 in a direction 422 through a chamber 410 with a top 411, a bottom 413, and walls 415. Chamber 410 may provide an interior wall 491 dividing chamber 410 into a separate buffing chamber 493 and cleaning chamber 495. Conveyance mechanism 420 may introduce item 430 into chamber 410 via entrance 412 and ultimately remove item 430 from chamber 410 via exit 414. Within chamber 410 particulate sodium bicarbonate may be projected toward item 430 by a first dispenser 440 and a second dispenser 450 although more or fewer dispensers than illustrated in the present example may be utilized. A particulate sodium bicarbonate delivery system 490 may provide particulate sodium bicarbonate for dispensing from first dispenser 440 via connection 494 and may provide particulate sodium bicarbonate for dispensing from second dispenser 450 via connection 495. First dispenser 440 may have a first nozzle 441 and a second nozzle 443 from which particulate sodium bicarbonate may be dispensed. Second dispenser 450 may have a first nozzle 451 and a second nozzle 453 from which particulate sodium bicarbonate may be dispensed. While any means of delivering particulate sodium bicarbonate to a dispenser 440, 450 may be used in accordance with the present invention, air pressure, such as may be attained utilizing compressed air and/or blowers, may be used to transport and project particles.

A tub 416, optionally with slanting or funnel shaped sides as illustrated in the example of FIG. 4, may be located in the chamber 410 beneath dispensers 440, 450 to gather previously dispensed particulate sodium bicarbonate 470. Previously dispensed particulate sodium bicarbonate 470 may be re-used for buffing further foam items, for example by using an intake mechanism 480, such as a vacuum tube, to return previously dispensed particulate sodium bicarbonate 470 to the delivery system 490. Tub 416 may have sufficient size to provide a sufficiently large reservoir of particulate sodium bicarbonate 470 for use in buffing by system 400, but additional/alternative reservoirs of particulate sodium bicarbonate may be provided within the scope of the present invention. The re-use of particulate sodium bicarbonate may incorporate a filter system and/or a cyclonic separation that relies on a rotational effect, in an example, to separate the particles below a threshold size from particles above a threshold size. For example, particles having a particle size of less than 140 mesh (0.105 mm) or 60 mesh (0.250 mm) may be discarded. The initial size of a sodium bicarbonate particle may be, for example, a particle size of 20 mesh (0.841 mm) or 40 mesh (0.420 mm), therefore permitting the particulate sodium bicarbonate to be reused numerous times before being discarded. Additionally contemplated ranges of particle include 20 mesh to 140 mesh, 20 mesh to 80 mesh, or 40 mesh to 80 mesh. Therefore, it is contemplated that the delivery system 490 may be comprised of a cyclone apparatus that uses cyclonic separation to sort particles that are of a sufficient size to be reused in a subsequent (or current) buffing operations.

A cleaning system may comprise a water spray nozzle 460 that sprays water 462 to ultimately remove any particulate sodium bicarbonate remaining on item 430 after buffing by dispensers 440, 450. Excess particulate sodium bicarbonate 471 may ultimately fall to the floor of a second tub 417, which may also have slanted sides to facilitate collection of used particulate sodium bicarbonate 471 for optional re-use. A recycling intake mechanism (not shown) may reintroduce the excess particulate sodium bicarbonate 471 into the particulate sodium bicarbonate delivery system 490 for subsequent reuse by dispensers 440, 450. Recycling mechanisms may comprise vacuum intake hoses, scraping mechanisms, etc. In further examples, recycling of previously projected particulate sodium bicarbonate may be accomplished by periodically gathering, either manually or in an automated fashion, excess particulate sodium bicarbonate that has been removed by a cleaning system or that has simply not engaged a foam item, such as item 430, previously. Recycling mechanisms may gather previously dispensed particulate sodium bicarbonate from one or both tubs 416, 417 in the example shown in FIG. 4.

Figure 5:
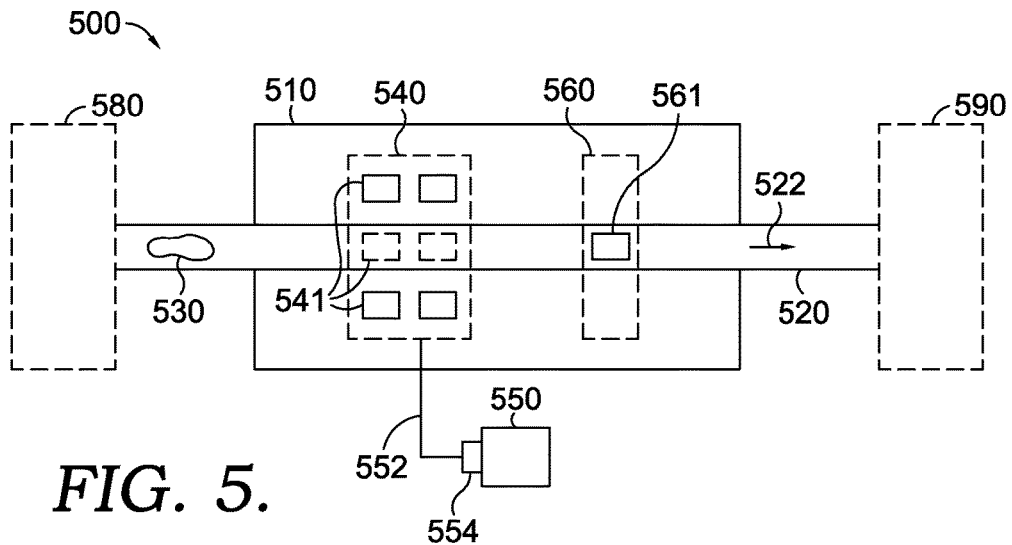
FIG. 5 illustrates a further schematic diagram of an example buffing system in accordance with the present invention.

Referring now to FIG. 5, a further schematic diagram of a system 500 for processing foam items, such as expanded EVA foam items, in accordance with the present invention is illustrated. Preparation system 580 may produce expanded EVA foam items, as described in conjunction with the present example, or other types of foam items. The expanded EVA foam items, such as item 530, may be expanded by activating a blowing agent and then stabilized to a desired size and shape by preparation system 580. The system(s) 580 for providing an expanded EVA foam item may utilize heat presses, EVA pellet dispensing systems, stabilization systems, ovens, cooling stations, etc. The item 530 formed by preparation system 580 may have a skin that prevents an item from being readily formed by a finishing system 590.

Conveyance mechanism 520 may receive the expanded EVA foam item 530 from preparation system 580 to transport item 530 through a chamber 510 in a direction indicated by arrow 522. Chamber 510 may comprise a buffing zone 540 with a plurality of particle dispensers, such as the exemplary particulate sodium bicarbonate dispensers 541. Any excess particulate sodium bicarbonate remaining on the item 530 may be removed in cleaning zone 560, which may provide a cleaner 561. Buffing zone 540 and cleaning zone 560 may comprise discrete chambers or may comprise different areas of a single chamber. Cleaner 561 may comprise, for example, a water washing system, a blower, a brush, a vibrational system, etc. that removes excess particulate sodium bicarbonate from the item 530. System 500 may further comprise a reservoir 550 that may provide particulate sodium bicarbonate to buffing zone 540 via a connection 552. Reservoir 550 may comprise fresh and unused particulate sodium bicarbonate, previously dispensed particulate sodium bicarbonate collected for re-use, or a combination of the two. Connection 552 may comprise, for example, a tube or hose. Connection 552 may carry particulate sodium bicarbonate from reservoir 550 under the force applied by projection mechanism 554 which may, for example, use compressed air, blowing air, or other means to transport particulate sodium bicarbonate from reservoir 550 to dispensers 541 of cleaning zone 540 and to impart a desired amount of force on the particulate sodium bicarbonate when projected from dispensers 541. After cleaning by cleaner 561 within cleaning zone 560, the item 530 may exit chamber 510 for further processing by a finishing system 590. The further processing performed by finishing system 590 may comprise, for example, a final molding of the buffed expanded EVA foam item into a final shape and/or configuration using the application of heat and/or pressure. The removal of some or all of the skin on the item 530 by system 500 may facilitate the formation of the final configuration of the expanded EVA foam item by systems 590.

Figure 6:
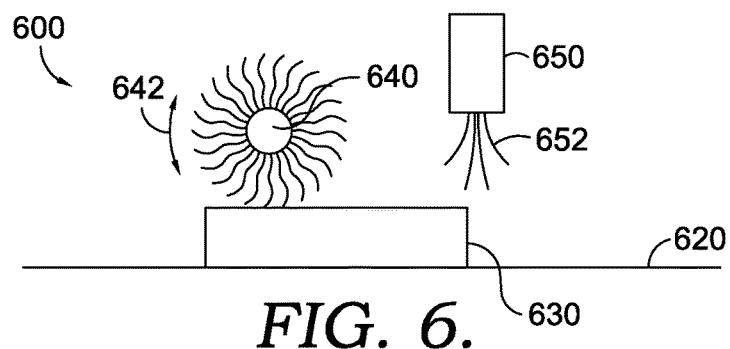
FIG. 6 illustrates a schematic diagram of an example cleaning system to remove excess particles from expanded foam items buffed in accordance with the present invention.

Referring now to FIG. 6, an example cleaning system 600 that may be used in systems and methods in accordance with the present invention is illustrated. Cleaning system 600 in the example of FIG. 6 may optionally utilize a brush 640 that rotates in one or more direction as indicated by arrow 642 to remove excess particulate sodium bicarbonate from the surface of a foam item 630 being moved by a conveyance mechanism 620. While not illustrated in the example of FIG. 6, a buffing zone, which may have used a plurality of dispensers, may have already buffed the exterior of item 630, for example to entirely or partially remove the skin from the exterior of an expanded EVA foam item. In addition to or instead of rotating brush 640, a water spray nozzle 650 may use water 652 to remove excess particulate sodium bicarbonate from the surface of the foam item 630. While both a brush 640 and water spray nozzle 650 are illustrated in the present example, one or both may be omitted, or even replaced with other cleaning mechanisms, such as air blowers, water baths, water sprays, vibrational mechanisms, etc. to dislodge excess particulate sodium bicarbonate from the surface of an item 630. More than one brush 640 and/or water spray nozzle 650 may be used in a cleaning system 600 in accordance with the present example, and the direction of travel of item 630 transported by conveyance mechanism 620 may vary, such that in the example of FIG. 6 either brush 640 or blower 650 may be encountered first by expanded EVA foam item 630.

Referring now to FIG. 7, yet a further schematic representation of an exemplary system 700 in accordance with the present invention is illustrated. In the example of FIG. 7, a chamber 710 having a top, bottom, and sides may permit a conveyance mechanism 720 to transport foam item 730 into the chamber 710 through an entrance 712, through an opening 752 between first portion 742 and second portion 762, and out of the chamber 710 via an exit 714. Chamber 710 may have a buffing zone 740 within a first portion 742 of chamber 710. First portion 742 may be separated from a second portion 762 of chamber 710 by an interior partition 750. Buffing zone 740 within first portion 742 may provide one or more dispensers of particulate sodium bicarbonate, such as described herein, for example. Chamber 710 may further optionally provide a cleaning zone 760 within a second portion 762 of chamber 710. Cleaning zone 760 may utilize moving air, brushes, water, vibrational mechanisms, or other processes to remove excess particulate sodium bicarbonate from an item 730. As shown in the example of FIG. 7, entrance 712 and exit 714 of chamber 710 may be elevated relative to the portion of chamber 710 where buffing zone 740 and cleaning zone 760 are located. For example, conveyance mechanism 720 may transport item 730 into chamber 710 via entrance 712 at a first height 722 and may transport item 730 out of chamber 710 via exit 714 at a second height 724. The first height 722 and second height 724 may be the same or different. Meanwhile, conveyance mechanism 720 may transport item 730 through a buffing zone 740 at a third height 726, and may further transport item 730 through an optional cleaning zone 760 at a fourth height 728, this third height 726 and fourth height 728 being less than the first height 722 and the second height 724. By elevating the entrance 712 and exit 714 of chamber 710 relative to the buffing zone 740 and optional cleaning zone 760, the waste of particulate sodium bicarbonate by escaping out of an entrance 712 and/or exit 714 may be reduced.

Still referring to FIG. 7, conveyance mechanism 720 may transport the item 730 through exit 714 at the second height 724 and optionally downwards after leaving exit 714. Upon departing chamber 714 a removal mechanism 780 may remove an item from the conveyance mechanism 720, and a collection station 790 may collect removed items 730.

FIG. 8 depicts a schematic representation of an exemplary system 800 in accordance with the present invention utilizing a removal mechanism 880 to remove a foam item 830 from a conveyance mechanism 820 after passing through a buffing zone 840 but prior to entering a cleaning zone 860. In the example of FIG. 8, a chamber 810 having a top, bottom, and sides may permit a conveyance mechanism 820 to transport foam item 830 into the chamber 810 through an entrance 812. Chamber 810 may have a buffing zone 840. Buffing zone 840 within chamber 810 may provide one or more dispensers of particulate sodium bicarbonate, such as described herein, for example. System 800 may further optionally provide a cleaning zone 860 outside of chamber 810. Cleaning zone 860 may utilize a water reservoir 862, but could utilize moving air, brushes, water sprays, vibrational mechanisms, or other processes to remove excess particulate sodium bicarbonate from items 830. A removal mechanism 880 may remove a foam item 830 from conveyance mechanism 820 to permit foam item 830 to enter cleaning zone 860. As shown in the example of FIG. 8, entrance 812 and exit 852 of chamber 810 may be elevated relative to the portion of chamber 810 where buffing zone 840 is located. For example, conveyance mechanism 820 may transport item 830 into chamber 810 via entrance 812 at a first height 822 and may transport item 830 out of chamber 810 via exit 852 at a second height 824. The first height 822 and second height 824 may be the same or different. Meanwhile, conveyance mechanism 820 may transport item 830 through a buffing zone 840 at a third height 826. This third height 826 being less than the first height 822 and the second height 824. By elevating the entrance 812 and exit 852 of chamber 810 relative to the buffing zone 840 the waste of particulate sodium bicarbonate by escaping out of an entrance 812 and/or exit 852 may be reduced.

Referring now to FIGS. 9A and 9B, showing a retaining mechanism 910 that may be used to retain a foam item 930 to conveyance mechanism 920 in accordance with the present invention is illustrated. Retaining mechanism 910 is only one example of a suitable retaining mechanism that may be used in conjunction with the present invention. In the present example, retaining mechanism 910 may be affixed to a conveyance mechanism 920 by a joint 915. In the present example, conveyance mechanism 920 may comprise a chain drive system that conveys retaining mechanism 910 via joint 915 to transport a foam item 930 through a system, such as the exemplary systems described herein. Retaining mechanism 910 may provide at least one prong, such as a first prong 912, a second prong 914, a third prong 916, and a fourth prong 918. A foam item 930 may be affixed to retaining mechanism 910 by moving foam item 930 as indicated by arrow 931 to engage prongs 912, 914, 916, 918 temporarily into foam item 930. Accordingly, foam item 930 may be moved through a system without being dislodged from retaining mechanism 910 by projected particles. However, other types of retaining mechanisms, such as clamps, clips, adhesives, and the like may be used in accordance with the present invention. Further, some examples of the present invention may gravitationally and/or frictionally retain a foam item upon a conveyance mechanism, such as a conveyor belt, and project buffing particles with selected buffing parameters at the foam items in a manner selected to avoid unnecessary risk of dislodging the foam item from such a conveyor belt. While the example illustrated in FIGS. 9A and 9B illustrate the use of four prongs in a retaining mechanism 910, other numbers of prongs, both more and fewer than shown, may be utilized in accordance with the present invention if a pronged retaining device is desired.

Referring now to FIG. 10, a further example of a retaining mechanism 1010 having at least a first prong 1012, a second prong (not shown), a third prong 1016, and a fourth prong (not shown) that may carry a foam item 1030 is illustrated. FIG. 10 further illustrates a first member 1080 and a second member 1082 used in the automated removal of foam item 1030 from retaining mechanism 1010. First member 1080 extends on a first side of retaining mechanism 1010 and second member 1082 extends along a second side of retaining mechanism 1010. First member 1080 and second member 1082 may comprise, for example, rods or similar structures affixed at or near the exit of a chamber or other buffing zone, such as buffing zone 840 described herein at FIG. 8. A conveyance mechanism (not shown) may move retaining device 1010 downwards via joint 1015 as indicated by arrow 1011 such that first member 1080 and second member 1082 contact the foam item 1030 retained on prongs 1012, 1016, and/or other non-depicted elements and may temporarily hold foam item 1030 in place while retaining device 1010 is conveyed downwards away from first member 1080 and second member 1082.

In some aspects, first member 1080 and second member 1082 may each have a wheel, caster, and/or roller located near an end of each member. In some aspects, first member 1080 may have a first wheel 1052 and second member 1082 may have a second wheel 1053. First wheel 1052 may be located at an end of first member 1080 that is near foam item 1030. Second wheel 1053 may be located at an end of second member 1082 that is near foam item 1030. In some aspects, first member 1080 and/or second member 1082 may be stationary. In some aspects, a wheel, such as wheel 1052 and wheel 1053 may roll independent of a member, such as first member 1080 and second member 1082. A rolling motion of each wheel may facilitate the removal of a foam item from a retaining mechanism by making and maintain contact with the foam item allowing the foam item to roll off and away from the retaining mechanism. For instance, in some aspects, first wheel 1052 and second wheel 1053 may make contact with foam item 1030 and utilizing the rolling motion, may maintain contact with foam item 1030 as foam item 1030 rolls off and away from retaining mechanism 1010. In some aspects, first member 1080 and second member 1082 may not have a first wheel 1052 and/or second wheel 1053. Additionally, in some aspects, a caster and/or roller may be used in place of a wheel as described above.

Prongs, such as prongs 1012 and 1016 may be inserted a certain distance within foam item 1030. For instance, prong 1014 may be inserted a distance 1013 within foam item 1030 and prong 1016 may be inserted a distance 1017 within foam item 1030. Each prong may have a unique length such that distance 1013 may be greater than, equal to, or less than distance 1017. In some aspects, distance 1013 and/or distance 1017 may be equal to one-half a depth of foam item 1030. In other aspects, each distance 1013 and/or distance 1017 may be greater than or less than one-half of a depth of foam item 1030.

Figure 11A:
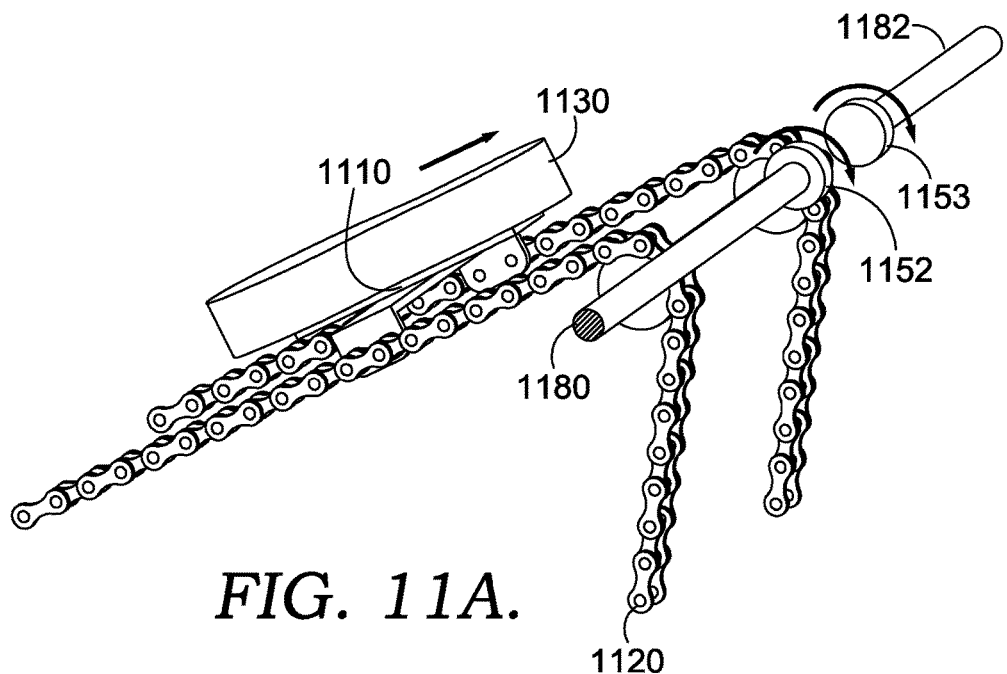
Figure 11B:
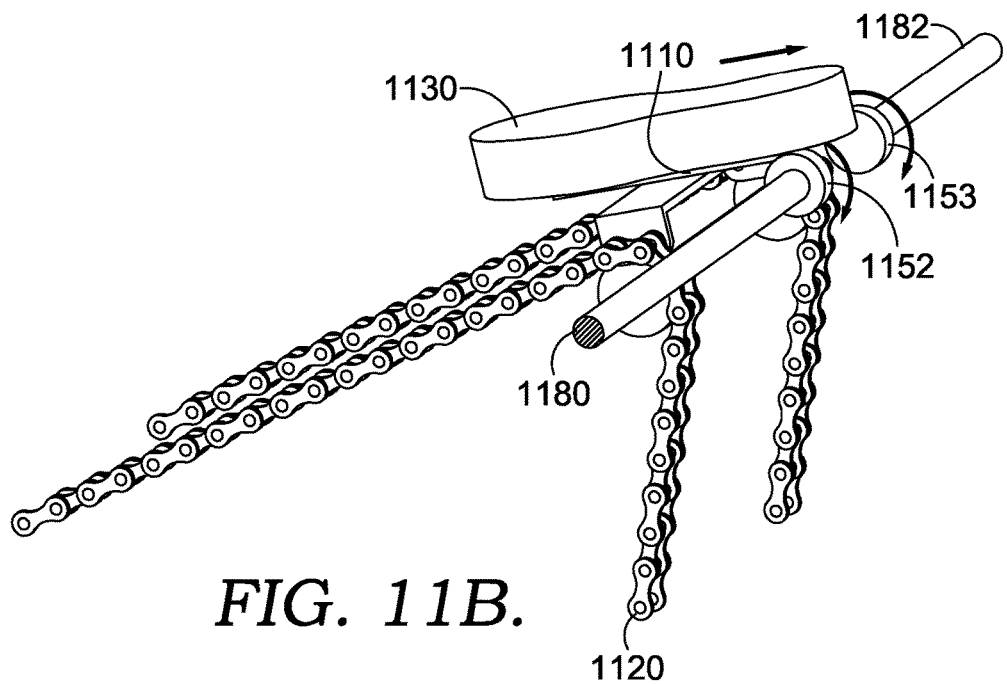
Figure 11C:
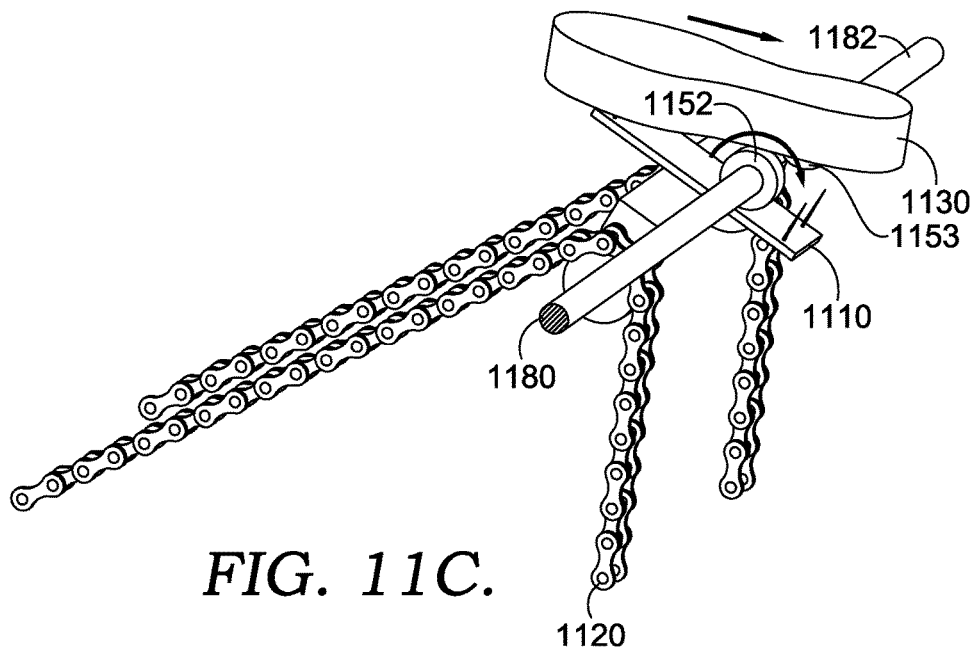
Figure 11D:
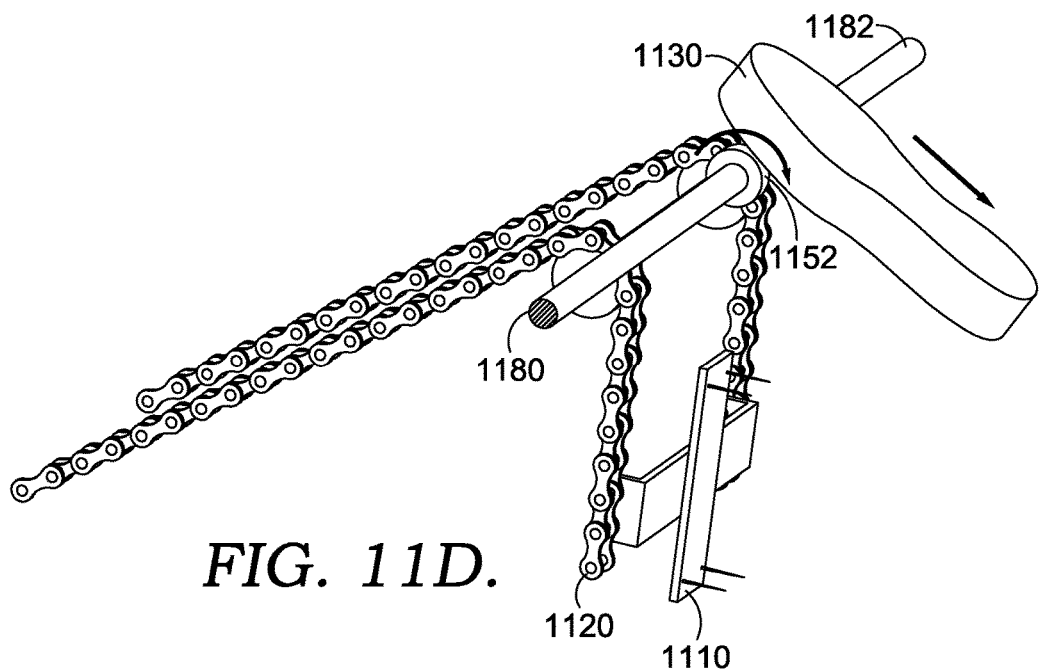

FIGS. 11A-11D illustrate an exemplary sequence in which a foam item 1130 may be removed from a retaining mechanism 1110 utilizing a first member 1180 and a second member 1182, which may each be comprised of a wheel, as described hereinafter. FIG. 11A illustrates retaining mechanism 1110 retaining foam item 1130 while approaching first member 1180 and second member 1182 utilizing a conveyor mechanism 1120. FIG. 11B illustrates foam item 1130 making an initial contact with first member 1180 and/or second member 1182. In some aspects, foam item 1130 may make contact with first member 1180 and/or second member 1182 prior to retaining mechanism 1110 reaching first member 1180 and/or second member 1182. In other aspects, foam item 1130 may make contact at the same time that retaining mechanism 1110 reaching first member 1180 and/or second member 1182. FIG. 11C illustrates foam item 1130 being removed from retaining mechanism 1110 utilizing first member 1180 and/or second member 1182. FIG. 11D illustrates foam item 1130 removed from retaining mechanism 1110. FIG. 11D also illustrates retaining mechanism 1110 being moved along conveyor mechanism 1120 while foam item 1130 may move independent of conveyor mechanism 1120.

In some aspects, first member 1180 and second member 1182 may have a wheel, caster, and/or roller located near an end of each member. In some aspects, first member 1180 may have a first wheel 1152 and second member 1182 may have a second wheel 1153. First wheel 1152 may be located at an end of first member 1180 that is near foam item 1130. Second wheel 1153 may be located at an end of second member 1182 that is near foam item 1130. In some aspects, a wheel may roll independent of each member. A rolling motion of each wheel may facilitate the removal of a foam item from a retaining mechanism by making and maintain contact with the foam item allowing the foam item to roll off of and away from the retaining mechanism. For instance, as shown in FIGS. 11B, 11C, and 11D, wheels 1152 and 1153 may rotate in a clockwise direction and/or in the same direction as foam item 1130. In some aspects, first wheel 1152 and second wheel 1153 may facilitate the removal of foam item 1130 from retaining mechanism 1110 by making and maintaining contact with foam item 1130 as foam item 1130 may roll off of and away from retaining mechanism 1110. In other aspects, first member 1180 and second member 1182 may not have first wheel 1152 and/or second wheel 1153. In some aspects, a caster and/or a roller may be used in place of a wheel as described above.

FIG. 12A illustrates a retaining mechanism 1210, a first member 1280, and a second member 1282. Retaining mechanism 1210 may have at least a first prong 1212 and a second prong 1216. Retaining mechanism may have a distance 1290 between first prong 1212 and second prong 1216. First member 1280 and second member 1282 may have a distance 1291 between one another. In some aspects, distance 1290 may be less than distance 1291. Allowing distance 1290 to be less than distance 1291 may prevent prongs, such as first prong 1212 and second prong 1216, from making contact with first member 1280 and/or second member 1282. In some aspects, first member 1280 and second member 1282 may each have a wheel, caster, and/or roller located near an end of each member. In some aspects, first member 1280 may have a first wheel 1252 and second member 1282 may have a second wheel 1253. First wheel 1252 may be located at an end of first member 1280 that is near foam item 1230. Second wheel 1253 may be located at an end of second member 1282 that is near foam item 1230. In some aspects, a wheel may roll independent of each member. A rolling motion of each wheel may facilitate the removal of a foam item from a retaining mechanism by making and maintain contact with the foam item allowing the foam item to roll off and away from the retaining mechanism. In some aspects, first wheel 1252 and second wheel 1253 may facilitate the removal of foam item 1230 from retaining mechanism 1210 by making and maintaining contact with foam item 1230 as foam item 1230 may roll off an away from retaining mechanism 1210. In other aspects, first member 1280 and second member 1282 may not have first wheel 1252, second wheel 1253, and/or any wheel. In some aspects, a caster and/or a roller may be used in place of a wheel as described above.

FIG. 12B illustrates a retaining mechanism 1210 having a length of 1292 and a foam item 1230 having a length of 1293. Retaining mechanism 1210 may have at least a first prong 1212 and a third prong 1214. In some aspects, length 1292 is less than length 1293. Having length 1292 to be less than length 1293 may facilitate an effective removal of foam item 1230 from retaining mechanism 1210 by allowing foam item 1230 to make contact with a first member, such as first member 1280, and/or a second member, such as second member 1282, prior to retaining mechanism 1210 making contact with the first member 1280 and/or second member 1282. In some aspects, foam item 1230 may make with the first member 1280 and/or second member 1282 prior to the retaining mechanism 1210 arriving at the location of first member 1280 and/or second member 1282, allowing foam item 1230 to be gently pulled away from retaining mechanism 1210, preventing damage from occurring to foam item 1230.

Referring now to FIG. 18, exemplary cleaning system 1801 is illustrated. In some aspects, cleaning system 1801 as described may be completely separate and modular from any other system, such as a buffing system. In other aspects, cleaning system 1801 may be juxtaposed to and/or within a chamber having another system, such as a buffing system. In additional aspects, cleaning system 1801 may be connected to a conveyance system to provide an environment for removing particles and/or other debris from a foam item. In some aspects, cleaning system 1801 receives a foam item 1830 that has been removed from a conveyance mechanism using a removal mechanism 1880 after exiting a treatment zone, such as buffing zone 840 as shown in FIG. 8. Cleaning system 1801 may be completely separate from a treatment zone like buffing zone 840. Cleaning system 1801 may have a first conveyance mechanism 1820, a second conveyance mechanism 1821, one or more wash nozzle assemblies 1840 each having one or more wash jets 1842, 1844, 1846, and 1848, one or more spray nozzle assemblies 1850 each having one or more spray nozzle outlets 1851 and 1852, one or more blowers 1860 each having one or more blow outlets 1861, 1862, 1863, and 1864, and/or a drip pan 1890. In some aspects, cleaning system 1801 has only one conveyance mechanism. In other aspects, cleaning system 1801 has more than two conveyance mechanisms. Each of first conveyance mechanism 1820 and second conveyance mechanism 1821 may be, for instance, a conveyor belt. In some aspects, a conveyor belt may be configured to allow for fluid to reach a foam item while still holding a foam item onto the conveyor belt. For instance, a conveyor belt may have sufficient openings to allow for fluid from the wash nozzle assemblies, spray nozzle assemblies, and blowers to contact at least a portion of and/or a majority of a surface of a foam item. The conveyor belt may also have enough material to sufficiently engage at least a portion of an upper and lower surface of the foam item to hold the foam item in place while the foam item is subject to the force of the projected fluids, gas, and/or air. In some aspects, a conveyor belt may be a grated belt, a mesh belt, or a widely chained belt having suitable openings.

First conveyance mechanism 1820 may have at least two rollers, a first roller 1870 and a second roller 1871, and may be coupled to a drive train 1816. Drive train 1816 may be used operate and/or rotate portions of first conveyance mechanism 1820. First conveyance mechanism 1820 may have a conveyor belt 1874. First conveyor belt 1874 may have a return portion 1875 and a material-contact portion 1876. Return portion 1875 may be a portion of first conveyor belt 1874 that may be located on a first side of first roller 1870 and a first side of second roller 1871. Return portion 1875 may also be a portion of first conveyor belt 1874 that is not in contact with a foam item, such as foam item 1830. Further, return portion 1875 may be a portion of first conveyor belt 1874 that faces away from second conveyance mechanism 1821. Material-contact portion 1876 may be a portion of first conveyor belt 1874 that is located on a second side of first roller 1870 and a second side of second roller 1871. Material-contact portion 1876 may also be a portion of first conveyor belt 1874 that is in contact with a foam item, such as foam item 1830. Additionally, material-contact portion 1876 may also be a portion of first conveyor belt 1874 that faces towards second conveyance mechanism 1821.

Second conveyance mechanism 1821 may have at least two rollers, a first roller 1872 and a second roller 1873, and may be coupled to drive train 1816. Drive train 1816 may be used operate and/or rotate portions of second conveyance mechanism 1821. Second conveyance mechanism 1820 may have a second conveyor belt 1877. Second conveyor belt 1877 may have a return portion 1879 and a material-contact portion 1878. Return portion 1879 may be a portion of second conveyor belt 1877 that may be located on a first side of first roller 1872 and a first side of second roller 1873. Return portion 1879 may also be a portion of second conveyor belt 1877 that is not in contact with a foam item, such as foam item 1830. Further, return portion 1879 may be a portion of second conveyor belt 1877 that faces away from first conveyance mechanism 1820. Material-contact portion 1878 may be a portion of second conveyor belt 1877 that is located on a second side of first roller 1872 and a second side of second roller 1873. Material-contact portion 1878 may also be a portion of second conveyor belt 1877 that is in contact with a foam item, such as foam item 1830. Additionally, material-contact portion 1878 may also be a portion of second conveyor belt 1877 that faces towards first conveyance mechanism 1820. As first conveyor belt 1874 and second conveyor belt 1877 rotate, sections of each belt may be alternatively related to return portion 1875, material-contact portion 1876, material-contact portion 1878, and return portion 1879. For instance, as first conveyor belt 1874 rotates, sections of return portion 1875 may rotate, thus becoming sections of material-contact portion 1876. Similarly, sections of material-contact portion 1876 may rotate and become sections of return portion 1875.

First conveyance mechanism 1820 may be positioned below second conveyance mechanism 1821 allowing foam item 1830 to pass between the first conveyance mechanism 1820 and second conveyance mechanism 1821. First conveyance mechanism 1820 and second conveyance mechanism 1821 may be tensioned towards one another such that foam item 1830 is tensionably compressed between first conveyance mechanism 1820 and second conveyance mechanism 1821. In some aspects, foam item 1830 may be tensionably compressed such that a top surface of foam item 1830 touches and/or is compressed by second conveyance mechanism 1821 and a bottom surface of foam item 1830 touches and/or is compressed by first conveyance mechanism 1820. Particularly, in some aspects, the bottom surface (or top surface) of foam item 1830 may be in contact with material-contact portion 1878 of second conveyor belt 1877 and the top surface (or bottom surface) of foam item 1830 may be in contact with material-contact portion 1876 of first conveyor belt 1874. In some aspects, a tension mechanism (not shown), such as a spring, may be used to spring load first conveyance mechanism 1820 and second conveyance mechanism 1821 towards one another. In some aspects, foam item 1830 may be positioned between first conveyance mechanism 1820 and second conveyance mechanism 1821 without first conveyance mechanism 1820 being tensioned towards second conveyance mechanism 1821, or vice versa. In certain aspects, first conveyance mechanism 1820 may be a distance 1832 from second conveyance mechanism 1821. Particularly, distance 1832 may represent a distance between a surface of material-contact portion 1876 of first conveyor belt 1874 and a surface of material-contact portion 1878 of second conveyor belt 1878. Foam item 1830 may have a height 1831. In some aspects, distance 1832 may be equal to height 1831. In other aspects, first conveyance mechanism 1820 may be tensionably coupled to second conveyance mechanism 1821 such that distance 1832 may vary. For instance, in some aspects, prior to foam item 1830 making contact with first conveyance mechanism 1820 and/or second conveyance mechanism 1821, distance 1832 may be slightly less than height 1831. Upon foam item 1830 making contact with first conveyance mechanism 1820 and/or second conveyance mechanism 1821, distance 1832 may be equal to or greater than height 1831.

In additional aspects, first conveyance mechanism 1820 may be offset a distance 1896 from second conveyance mechanism 1821 such that foam item 1830 reaches first conveyance mechanism 1820 before reaching second conveyance mechanism 1821. Providing an offset between the first conveyance mechanism 1820 and the second conveyance mechanism 1821 may allow for foam item 1830 to enter cleaning system 1801 smoothly. For instance, foam item 1820 may make initial contact with first conveyance mechanism 1820 and be retained on top of first conveyance mechanism 1820. Once foam item 1820 is stable and/or retained on top of first conveyance mechanism 1820, foam item 1830 may then be contacted by second conveyance mechanism 1821. As foam item 1830 is already stable on first conveyance mechanism 1830, the contact by second conveyance mechanism 1821 may not force foam item 1830 off of first conveyance mechanism 1820. Rather, the contact by second conveyance mechanism 1821 allows foam item 1830 to be sandwiched between first conveyance mechanism 1820 and second conveyance mechanism 1821. Distance 1896 may be equal to or greater than a length of foam item 1830. In some aspects, distance 1896 is equal to 2, 3, 4, or 5 times a length of foam item 1830. In other aspects, distance 1896 is less than a length of foam item 1830.

Wash nozzle assemblies 1840 may be connected to one or more pump motors 1814 and used to project fluid, such as water, towards foam item 1830 in order to remove particles from foam item 1830. Pump motors 1814 may be used to pump fluid through wash nozzle assemblies 1840. As used herein, fluid may be a liquid, air, or gas. Each wash nozzle assembly 1840 may have one or more wash jets, such as wash jets 1842, 1844, 1846, and 1848 that extend outwardly, away from one another. In some aspects, a first wash nozzle assembly may have more or less wash jets than a second wash nozzle. In other aspects, a first wash nozzle assembly may have an equal number of wash jets as a second wash nozzle. Fluid may be projected towards foam item 1830 by each wash jet at a specified rate, pressure, volume, angle, and temperature. Wash jets 1842 and 1844 may be positioned near second conveyance mechanism 1821, while wash jets 1846 and 1848 may be positioned near first conveyance mechanism 1820. In some aspects, a first set of wash jets may be positioned near a first conveyance mechanism and/or on a first side of a foam item, while a second set of wash jets may be positioned near a second conveyance mechanism and/or on a second side of a foam item. In some aspects, wash jets may be inserted in between each loop of first conveyance mechanism 1820 and/or second conveyance mechanism 1821, as shown in FIG. 18. Wash jets may be inserted such that each wash jets goes through only one-half of a loop of first conveyance mechanism 1820 and/or second conveyance mechanism 1821. By positioning wash jets between each loop of a conveyance mechanism, each wash jet may project fluid through only one portion of a conveyor belt, such as material-contact portion 1876, instead of through two portions of a conveyor belt, such as return portion 1875 and material-contact portion 1876. By allowing the wash jets to project fluid through only one portion of a conveyor belt, better fluid contact with a foam item is provided. Wash jets may be positioned to project fluid through a portion of a conveyor belt onto a top surface and/or bottom surface of a foam item. Additionally, wash jets may also be positioned outside of a conveyor belt so as to project fluid onto side surfaces of a foam item. Wash jets positioned outside of a conveyor belt and/or between a conveyor belt may be rotated at various angles so as to project fluid onto various surfaces of a foam item.

Spray nozzle assemblies 1850 may have one or more spray nozzle outlets, such as spray nozzle outlets 1851 and 1852 that may project fluid, such as water, towards foam item 1830. Spray nozzle assemblies 1850 may project fluid towards foam item 1830 at a specified rate, pressure, volume, angle, and temperature. In some aspects, the specified rate, pressure, volume, angle, temperature, and type of fluid projected from each spray nozzle outlet, such as spray nozzle outlet 1852, may be different from the specified rate, pressure, volume, angle, temperature, and type of fluid projected from each wash jet, such as wash jet 1842. In other aspects, the specified rate, pressure, volume, angle, temperature, and type of fluid projected from each spray nozzle outlet, such as spray nozzle outlet 1852, may be the same as the specified rate, pressure, volume, angle, temperature, and type of fluid projected from each wash jet, such as wash jet 1842. A first wash nozzle assembly may be positioned a distance 1898 from a second wash nozzle. Additionally, a wash nozzle assembly may be positioned a distance 1897 from a spray nozzle. In some aspects distance 1898 is the same as distance 1897. In other aspects distance 1898 is greater than or less than distance 1897.

Blower 1860 may be connected to one or more blow motors 1812 and have blow outlets 1861, 1862, 1863, and 1864 that allow gas or air to be blown towards foam item 1830. Blow motors 1812 may be used to provide gas or air through blower 1860. The gas or air provided by blower 1860 may have a specified temperate, pressure, rate, and volume. Blower 1860 may be positioned a distance 1893 from a spray nozzle, such as spray nozzle assembly 1850. Additionally, blower 1860 may be positioned a distance 1892 from a wash nozzle, such as wash nozzle assembly 1840. In some aspects, distance 1893 is greater than or equal to distance 1892. In other aspects, distance 1893 is less than distance 1982. A drain pan 1890 may catch and/or collect particles removed from and fluids projected towards foam item 1830.

In some aspects, foam item 1830 may be removed from a conveyance mechanism by removal mechanism 1880 and may enter cleaning system 1801. Upon entering cleaning system 1801, foam item 1830 may make contact with first conveyance mechanism 1820 and second conveyance mechanism 1821. In some aspects, foam item 1830 makes contact with first conveyance mechanism 1820 prior to making contact with second conveyance mechanism 1821. In other aspects, foam item 1830 makes contact with first conveyance mechanism 1820 and second conveyance mechanism 1821 at the same time. In additional aspects, foam item 1830 is compressed between first conveyance mechanism 1820 and second conveyance mechanism 1821 so as to hold foam item 1830 between first conveyance mechanism 1820 and second conveyance mechanism 1821 as fluids are projected towards foam item 1830. Fluids may be projected towards foam item 1830 by one or more wash nozzle assemblies 1840, and one or more spray nozzle assemblies 1850. Additionally, in some aspects, gas or air may be projected towards foam item 1830 by blower 1860. Fluids projected towards foam item 1830 may be caught and/or collected by drain pan 1890. Drain pan 1890 may have one or more sections that may be angled in various directions such that particles and/or fluids may be drained away from cleaning system 1801.

Referring now to FIG. 13, a method 1300 for processing foam items in accordance with the present invention is illustrated. In step 1310 a foam item, that may be a portion of a footwear sole, may be formed having an intermediate size and an intermediate shape. Step 1310 may comprise, for example, utilizing heat and/or pressure to activate a blowing agent in an EVA material and, optionally, stabilizing the expanded EVA foam item. In step 1320, particles, such as particulate sodium bicarbonate, may be projected at the foam item until at least a portion of the foam item is removed. Step 1320 may utilize a plurality of discrete dispensers that project particles at the foam item at a particular rate, angle, force, distance, duration, etc. Alternatively, step 1320 may utilize generally circulating particles, for example within a chamber, to contact and engage with the surface of the foam item. Additionally, the particles projected at the foam item may have a hardness of between 1.0 and 5.0 Mohs. In step 1330, the foam item may be heated and molded into a final shape and a final size. Step 1330 may impart the final texture, configuration, construction, and functional/aesthetic characteristics desired for the final foam item.

Referring now to FIG. 14, a method 1400 for buffing a foam item in accordance with the present invention is illustrated. In step 1410 a foam item, may be formed having an intermediate size and an intermediate shape. Step 1410 may comprise, for example, utilizing heat and/or pressure to activate a blowing agent in an EVA material and, optionally, stabilizing the expanded EVA foam item. In forming the foam item into an intermediate size and an intermediate shape, the foam item may have a first portion that has a first density and a skin layer that has a second density. The second density may be greater than the first density. In step 1420, particles, such as particulate sodium bicarbonate, may be projected at the foam item until at least a portion of the skin layer is removed from the foam item. Step 1420 may utilize a plurality of discrete dispensers that project particles at the foam item at a particular rate, angle, force, distance, duration, etc. Alternatively, step 1420 may utilize generally circulating particles, for example within a chamber, to contact and engage with the surface of the foam item. Additionally, the particles projected at the foam item may have a particle size greater than 140 mesh. In step 1430, the foam item, having been buffed in step 1420, may be heated and molded into a final shape and a final size. Step 1430 may impart the final texture, configuration, construction, and functional/aesthetic characteristics desired for the final foam item.

Referring now to FIG. 15, a method 1500 for buffing a foam item in accordance with the present invention is illustrated. In step 1510 a pre-form foam item, that may eventually be formed into a portion of a footwear sole, may be formed having an intermediate size and an intermediate shape. Step 1510 may comprise, for example, utilizing heat and/or pressure to activate a blowing agent in an EVA material and, optionally, stabilizing the expanded EVA foam item. In step 1520, particles, such as particulate sodium bicarbonate, may be projected at the foam item until at least a portion of the foam item is removed. Step 1520 may utilize a plurality of discrete dispensers that project particles at the pre-form foam item at a particular rate, angle, force, distance, duration, etc. Alternatively, step 1520 may utilize generally circulating particles, for example within a chamber, to contact and engage with the surface of the foam item. Additionally, the particles projected at the foam item may have a hardness of between 1.0 and 5.0 Mohs and a particle size greater than 140 mesh. In step 1530, the pre-form foam item may be heated and molded into a final shape and a final size. Step 1530 may impart the final texture, configuration, construction, and functional/aesthetic characteristics desired for the final foam item.

Referring now to FIG. 16, a further method 1600 of buffing a foam item in accordance with the present invention is illustrated. In step 1610 a foam item, such as an expanded EVA foam item, may be pre-formed having an intermediate size and shape. Step 1610 may comprise, for example, using heat and/or pressure to activate a blowing agent and, optionally, thereafter stabilizing the resulting expanded EVA foam item into the intermediate size and shape. Step 1610 may form a skin layer on the surface of the foam item. In step 1620 the foam item may be conveyed through a chamber. Step 1620 may utilize a conveyance mechanism, such as a chain drive or a conveyor belt, and may utilize an entrance to permit access to the chamber. In step 1630, particles, such as particulate sodium bicarbonate, may be projected at the foam item while the foam item is conveyed through the chamber. Step 1630 may meet desired buffing parameters that require the rate, force, impact angle, etc. at which the particles contact the foam item. For example, step 1630 may project sodium bicarbonate particles, having a particular size, at a selected rate, with a selected force, and so as to contact the foam item at selected angles. Step 1630 may utilize one or more dispensers that utilize a mechanism, such as compressed air or a blower, to project particles at a known rate, force, angle, etc.

Following step 1630, an optional step 1635 may be performed in exemplary aspects. However, it is contemplated optional step 1635 may be omitted altogether in alternative exemplary aspects. The step 1635 provides for the recovery of particles for reuse in the process. For example, particles above a size threshold (e.g., 140 mesh) may be recycled into the process for subsequent buffing applications. Particles below the threshold may be collected, but removed from the system as they are less effective in accomplishing aspects of the present invention in an exemplary aspect.

Following step 1630 or optional step 1635, a step 1640 removes excess particles from the buffed foam item by cleaning. It is contemplate that step 1640 may also be optional in the method 1600. Step 1640 may utilize any mechanism or process, such as air blowers, brushes, vibrational systems, etc. In step 1650 the buffed foam item may be conveyed out of the chamber, for example by leaving the chamber through an exit via a conveyance mechanism. Method 1600 may conclude with step 1660 forming the buffed foam item into its desired final form by heating and molding.

The parameters of the projection of particles, such as particulate sodium bicarbonate, in step 1630 may be selected in at least partial dependence upon thickness, hardness, or other properties of the skin layer formed on the item in step 1610 and/or the degree of moldability desired to form the final foam item in step 1660. For example, if a high degree of moldability is desired for step 1660 and/or if a particularly thick skin layer is expected to be formed on a foam item in step 1610, step 1630 may comprise a relatively high rate of projection of particles, a particularly high force of projection, a relatively long duration of projection, etc. to remove a greater amount, or even all, of the skin layer formed on the foam item in step 1610 to secure the desired amount of moldability in step 1660. On the other hand, other applications of systems and methods in accordance with the present invention may require less skin layer removal from the exterior of a foam item, permitting the particle projection parameters of step 1630 to be adjusted accordingly.

Referring now to FIG. 17, a further exemplary method 1700 in accordance with the present invention for buffing a foam item is illustrated. In step 1710, a foam item may be pre-formed having an intermediate size and shape. Step 1710 may comprise using heat and pressure to activate a blowing agent in an EVA material and to form an EVA foam item, but other types of foam items may be pre-formed in step 1710 in accordance with the present invention. Step 1710 may result in a skin layer being formed on the foam item that may interfere with forming the foam item into a final size and final shape. In step 1720, the foam item may be retained on a conveyance mechanism. Step 1720 may use a retaining mechanism such as the example retaining mechanism described above. In step 1730, the foam item may be conveyed into a buffing chamber. Some examples of suitable buffing chambers are described above. While a separate buffing chamber and a cleaning chamber are discussed, it is contemplated that a common chamber may house both a buffing mechanism and a cleaning mechanism, as contemplated herein. Step 1730 may utilize the conveyance mechanism to which the foam item was retained in step 1720.

In step 1740, particles, such as sodium bicarbonate, larger than a first size and smaller than a second size may be projected at the foam item within the buffing chamber. In some aspects, the first size may be 140 mesh and the second size may be 20 mesh. However, it is contemplated that the only constraint applied to the selection of the particle may be the first size, or the smallest acceptable size of particle for use in buffing. Step 1740 may utilize multiple dispensers and may project particles with desired buffing parameters, such as at desired angles, forces, distances, etc. Step 1740 may be repeated at multiple locations within a buffing chamber. Each repetition of step 1740 may utilize different sizes of particles and/or different buffing parameters. In step 1750, particles larger than the first size (e.g., 140 mesh) may be recycled for additional buffing applications and particles smaller than the first size may be discarded. The effect of step 1750 may be to reuse the particles for buffing additional foam items until the particles have become too small to buff effectively, such as described above in some examples. In step 1760, the foam item may be conveyed out of the buffing chamber. Step 1760 may utilize the conveyance mechanism to which the foam item was retained in step 1720. In step 1765, the foam item may be removed from the conveyance mechanism. Step 1765 may be performed by a removal mechanism, manually, or through any other means.

In step 1770, the foam item may be conveyed into a cleaning zone. Step 1770 may utilize the conveyance mechanism to which the foam item was retained in step 1720. Further, step 1760 and step 1770 may be combined into a single step of method 1700, for example if a buffing chamber and a cleaning zone are immediately adjacent within a system. In step 1780, some or all of the remaining particles may be removed from the foam item within the cleaning zone. Step 1780 may utilize moving air, brushes, water or other solvents, vibrational systems, or any other means to remove some or all of the sodium bicarbonate particles from the foam item within the cleaning zone. Method 1700 may conclude with step 1790 to form the foam item into a final size and shape. Step 1790 may result in a final product or may provide a component for use in subsequent assembly of a final product.

FIG. 19A illustrates a side perspective of a foam item 1900 having an intermediate size and shape, in accordance with aspects of the present invention. The foam item 1900 has a bottom surface 1904, a sidewall 1907, and a top surface. The sidewall may extend around the foam item, such as along a toe end 1910, a medial side, a lateral side 1906, and a heel end 1908, in an exemplary aspect. It is contemplated that one or more specific or general portions may be buffed in accordance with aspects of the present invention. For example, it is contemplated that the sidewall 1907 (or portions of the side wall 1907) may be the area effectively buffed while the bottom surface 1904 (or portions of the bottom surface 1904) may remain in a substantially unbuffed state. Further, as alluded to above, it is contemplated that portions of the sidewall 1907 may be buffed, such as the medial side, lateral side 1906, and the heel end 1908 may be buffed while the toe end 1910 remains in a substantially unbuffed state, in an exemplary aspect. The selection of one or more portions to buff may depend on where a remolding is intended to occur on the foam item. For example, if the sidewall 1907 is the primary portion to receive a change in size and/or shape by a subsequent molding operation, the buffing operation may be focused on those particular areas. Stated differently, it is contemplated that a location intended to have a post-buffing molded feature formed may determine what portions of the foam item are to be buffed by a buffing operation. Such that the buffing operation removes a portion of an outer surface of the foam item that may inhibit the post-buffing molding process.

FIG. 19B illustrates a side perspective of a foam item 1902 having a final size and shape, in accordance with aspects of the present invention. In an exemplary aspect, the foam item 1902 is a remolded version of the foam item 1900 of FIG. 19A. In this example, the size and shape of the foam item 1900 is adjusted through a buffing process and a subsequent molding process. A subsequent molding process may be implemented to refine a size and shape of the foam item, such as adding dimensional characteristics, such as features 1910, 1912. Features 1910, 1912 may be formed by a post-buffing molding operation to achieve a desired final size and/or shape of the foam item 1902. Features 1910, 1912 are merely provided for illustrative purposes and it is contemplated that any feature may be formed, such as a protrusion, indentation, texture, and the like may be formed in a post-buffing molding operation. The removal of foam, such as a denser portion proximate the surface of the sidewall 1907 than an internal portion, may enhance the post-buffing molding effectiveness in those areas substantially affected by the buffing operation. Stated differently, it is contemplated that the buffing operation increases the effectiveness of a post-buffing molding operation because a portion of a relatively denser material has been removed by the buffing process.

While systems and methods in accordance with the present invention have been described herein with regard to specific examples, it is contemplated that variations made to these examples fall within the scope of the present invention. For example, any number or orientation of dispensing mechanisms may be used to provide particles to items for buffing. Recycling of used particles may involve mechanisms and techniques, such as cyclonic separation, to remove any dislodged particles from skin layers on items, or to otherwise evaluate the continued suitability of gathered particles, such as sodium bicarbonate, for further use. Multiple zones for buffing may be employed, and different zones may employ different buffing parameters or even different types of particles. Various types of conveyance mechanisms may be used in accordance with the present invention, beyond those described in examples herein. Various examples of components of systems in accordance with the present invention may be rearranged or omitted without departing from the scope of the present invention. Similarly, the methods in accordance with the present invention may be performed with steps in different orders than illustrated herein, and further some steps may be added or omitted without departing from the scope of the present invention.

What is claimed is:

1. A method for processing foam items, the method comprising:
   forming a foam item having an intermediate size and an intermediate shape;
   projecting particles at the foam item until at least a portion of the foam item is removed, the particles having a hardness of between 1.0 and 5.0 Mohs; and
   forming the foam item into a final shape and a final size adapted for being a portion of a footwear sole.

2. The method for processing foam items of claim 1, wherein the projecting the particles at the foam item further comprises projecting the particles with a predetermined force, at a predetermined angle relative to the foam item, and for a predetermined duration of time.

3. The method for processing foam items of claim 2, wherein forming the foam item into the intermediate size and the intermediate shape comprises applying heat and pressure to a material within a mold to form the material into the foam item having a size and shape determined by the mold.

4. The method for processing foam items of claim 3, wherein the material formed into the foam item comprises an ethylene vinyl acetate mixture.

5. The method for processing foam items of claim 4, wherein the projecting the particles at the foam item further comprises projecting dry ice particles at the foam item.

6. The method for processing foam items of claim 4, wherein the projecting the particles at the foam item further comprises projecting ice particles at the foam item.

7. The method for processing foam items of claim 4, wherein the projecting the particles at the foam item further comprises projecting particulate sodium bicarbonate at the foam item.

8. The method for processing foam items of claim 7, wherein the particulate sodium bicarbonate has a particle size of at least 140 mesh.

9. The method of processing foam items of claim 1, further comprising:
   providing a supply of particles for projecting at the foam item, the provided supply of particles having a particle size larger than 140 mesh; and
   after projecting the particles at the foam item, recycling a first subset of the particles, the first subset of the particles having a particle size larger than 140 mesh.

10. The method for processing foam items of claim 9, further comprising, after projecting the particles at the foam item, discarding a second subset of the particles, the second subset having a particle size smaller than 140 mesh.

11. The method for processing foam items of claim 1, further comprising removing at least some of the particles from the foam item after projecting particles at the foam item.

12. The method for processing a foam item of claim 1, wherein the forming the foam item into the final shape and the final size comprises forming the foam item utilizing a heated mold.

13. The method for processing a foam item of claim 12, wherein forming the foam item utilizing the heated mold comprises adding dimensional characteristics to a portion of the foam item impacted by the particles.

14. A method for buffing a foam item, the method comprising:
   forming a foam item having an intermediate size and an intermediate shape using a process that creates a first portion having a first density and a surface layer having a second density, wherein the second density is more dense than the first density;
   projecting particles at the foam item until at least a portion of the surface layer is removed from the foam item, the particles having a size greater than 140 mesh; and
   after projecting the particles at the foam item, forming the foam item into a final shape and a final size.

15. The method for buffing the foam item of claim 14, further comprising:
   after projecting the particles, recycling a first subset of the particles having a particle size larger than 140 mesh.

16. The method for buffing the foam item of claim 15, further comprising:
   after projecting the particles, discarding a second subset of the particles having a particle size smaller than 140 mesh.

17. The method for buffing the foam item of claim 13, wherein the material formed into the foam item comprises an ethylene vinyl acetate mixture.

18. The method for buffing the foam item of claim 13, wherein the projecting the particles at the foam item further comprises projecting particulate sodium bicarbonate at the foam item.

19. A method for buffing a pre-form foam item, the method comprising:
- forming a pre-form foam item having an intermediate size and an intermediate shape, the foam item being a portion of a footwear sole;
- projecting particles at the pre-form foam item until at least a portion of foam is removed from the pre-form foam, the particles having a hardness of between 1.0 and 5.0 Mohs and a particle size larger than 140 mesh; and
- after projecting the particles at the foam item, forming the pre-form foam item into a final shape and a final size.

20. The method for buffing a foam item of claim 19, wherein the preform comprises an ethylene vinyl acetate mixture.

* * * * *